US012666228B2

(12) United States Patent
Han

(10) Patent No.: US 12,666,228 B2
(45) Date of Patent: Jun. 23, 2026

(54) WIRELESS SOUND OUTPUT DEVICE AND WIRELESS SOUND OUTPUT SYSTEM COMPRISING SAME

(71) Applicant: LG ELECTRONICS INC., Seoul (KR)

(72) Inventor: Munyong Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 558 days.

(21) Appl. No.: 18/248,517

(22) PCT Filed: Oct. 23, 2020

(86) PCT No.: PCT/KR2020/014615
§ 371 (c)(1),
(2) Date: Apr. 10, 2023

(87) PCT Pub. No.: WO2022/085831
PCT Pub. Date: Apr. 28, 2022

(65) Prior Publication Data
US 2023/0379667 A1      Nov. 23, 2023

(51) Int. Cl.
*H04W 4/06* (2009.01)
*H04R 1/10* (2006.01)
H04L 45/74 (2022.01)

(52) U.S. Cl.
CPC ............... *H04W 4/06* (2013.01); *H04R 1/10* (2013.01); *H04L 45/74* (2013.01); *H04R 2420/07* (2013.01)

(58) Field of Classification Search
CPC . H04W 4/06; H04W 4/80; H04R 1/10; H04R 2420/07; H04R 3/12; H04L 45/74; H04L 1/18
See application file for complete search history.

(56) References Cited

U.S. PATENT DOCUMENTS

| | | | | |
|---|---|---|---|---|
| 7,693,125 B2 * | 4/2010 | Ihm | ........................ | H04L 1/1819 |
| | | | | 455/101 |
| 7,733,840 B2 * | 6/2010 | Ihm | ........................ | H04L 1/1607 |
| | | | | 455/101 |

(Continued)

FOREIGN PATENT DOCUMENTS

| | | | | |
|---|---|---|---|---|
| AU | 2005320417 B2 * | 12/2009 | ........... | H04L 1/0656 |
| CA | 2689168 A1 * | 2/2009 | ........... | H04W 88/02 |

(Continued)

OTHER PUBLICATIONS

PCT International Application No. PCT/KR2020/014615, International Search Report dated Jul. 6, 2021, 5 pages.

(Continued)

*Primary Examiner* — Michael A Keller
(74) *Attorney, Agent, or Firm* — LEE, HONG, DEGERMAN, KANG & WAIMEY

(57) ABSTRACT

The present disclosure relates to a wireless sound output device and a wireless sound output system including the same. A wireless sound output device according to an embodiment of the present disclosure includes a first audio receiving device to receive data from an audio transmitting device and a second audio receiving device to receive data from the audio transmitting device or from the first audio receiving device. The second audio receiving device transmits response data to the first audio receiving device based on the received data, packet data of a controller layer of the response data includes an access code and a header, the access code includes a device ID, and the header includes type information. Accordingly, data transmission delay between the audio receiving devices can be reduced, and security can be strengthened.

16 Claims, 21 Drawing Sheets

10

(56) References Cited

U.S. PATENT DOCUMENTS

| 7,889,708 | B2 * | 2/2011 | Ihm | H04L 1/1607 |
| | | | | 455/101 |
| 8,279,774 | B2 * | 10/2012 | Roberts | H04L 1/1803 |
| | | | | 455/442 |
| 8,654,661 | B2 * | 2/2014 | Wang | H04L 1/1819 |
| | | | | 370/282 |
| 8,768,252 | B2 * | 7/2014 | Watson | H04R 3/00 |
| | | | | 455/3.06 |
| 9,608,791 | B2 * | 3/2017 | Choi | H04W 72/0446 |
| 9,838,163 | B2 * | 12/2017 | Kim | H04L 1/1812 |
| 10,498,497 | B2 * | 12/2019 | Yang | H04L 1/1861 |
| 10,680,781 | B2 * | 6/2020 | Li | H04L 1/1861 |
| 10,958,381 | B2 * | 3/2021 | Kim | H04L 1/1819 |
| 11,088,806 | B2 * | 8/2021 | Seo | H04L 1/1816 |
| 11,233,608 | B2 * | 1/2022 | Chen | H04L 1/1819 |
| 11,825,472 | B2 * | 11/2023 | Saber | H04W 72/569 |
| 11,838,918 | B2 * | 12/2023 | Oh | H04L 1/1887 |
| 12,177,744 | B2 * | 12/2024 | Takeda | H04L 1/1819 |
| 12,289,742 | B2 * | 4/2025 | Zhang | H04W 72/232 |
| 12,452,856 | B2 * | 10/2025 | Papasakellariou | H04L 5/0064 |
| 2010/0017675 | A1 * | 1/2010 | Ihm | H04L 1/1819 |
| | | | | 714/751 |
| 2010/0202433 | A1 * | 8/2010 | Ihm | H04L 1/0656 |
| | | | | 370/343 |
| 2010/0278093 | A1 * | 11/2010 | Wang | H04W 72/30 |
| | | | | 370/312 |
| 2012/0058727 | A1 | 3/2012 | Cook et al. | |
| 2014/0348327 | A1 * | 11/2014 | Linde | H04W 4/80 |
| | | | | 381/2 |
| 2015/0006988 | A1 * | 1/2015 | Kim | H04L 1/08 |
| | | | | 714/749 |
| 2015/0327001 | A1 * | 11/2015 | Kirshenberg | H04W 4/80 |
| | | | | 455/41.2 |
| 2016/0173239 | A1 * | 6/2016 | Kim | H04L 1/1812 |
| | | | | 370/329 |
| 2016/0261391 | A1 * | 9/2016 | Chen | H04L 1/1861 |
| 2017/0311201 | A1 * | 10/2017 | Uchino | H04L 1/1825 |
| 2017/0324521 | A1 * | 11/2017 | Seo | H04L 5/0055 |
| 2018/0152274 | A1 * | 5/2018 | Li | H04W 28/04 |
| 2018/0212717 | A1 * | 7/2018 | Yang | H04L 1/1812 |
| 2020/0177348 | A1 | 6/2020 | Agarwal et al. | |
| 2020/0220692 | A1 * | 7/2020 | Seo | H04L 1/1816 |
| 2021/0111835 | A1 * | 4/2021 | Khoshnevisan | H04W 72/02 |
| 2021/0306981 | A1 * | 9/2021 | Liu | H04L 1/1896 |
| 2022/0182188 | A1 * | 6/2022 | Fu | H04L 5/0055 |
| 2023/0422347 | A1 * | 12/2023 | Li | H04L 5/0048 |
| 2024/0008054 | A1 * | 1/2024 | Zhang | H04W 72/232 |
| 2024/0172212 | A1 * | 5/2024 | Papasakellariou | H04L 1/1854 |
| 2025/0253977 | A1 * | 8/2025 | Yao | H04L 1/1812 |
| 2025/0392433 | A1 * | 12/2025 | Sun | H04L 1/1861 |

FOREIGN PATENT DOCUMENTS

| CN | 101883325 | A | * | 11/2010 | H04W 72/30 |
| CN | 102067499 | A | * | 5/2011 | H04L 1/1829 |
| CN | 101883325 | B | * | 7/2014 | H04W 72/30 |
| CN | 107196748 | A | * | 9/2017 | H04W 88/02 |
| CN | 107431581 | A | * | 12/2017 | H04L 5/0055 |
| CN | 109474393 | A | * | 3/2019 | H04L 1/1806 |
| CN | 107431581 | B | * | 10/2020 | H04L 1/1812 |
| CN | 109474393 | B | * | 7/2021 | H04W 72/23 |
| CN | 110199495 | B | * | 7/2021 | H04L 1/0018 |
| CN | 113544989 | A | * | 10/2021 | H04W 72/04 |
| CN | 113812104 | A | * | 12/2021 | H04W 16/14 |
| CN | 117242726 | A | * | 12/2023 | |
| CN | 112470418 | B | * | 5/2024 | H04W 72/11 |
| CN | 114826521 | B | * | 5/2024 | H04L 5/0055 |
| CN | 114585097 | B | * | 10/2024 | H04L 5/0048 |
| CN | 116235625 | B | * | 6/2025 | H04L 1/1812 |
| EP | 2639986 | A2 | * | 9/2013 | H04W 72/23 |
| EP | 2662993 | A2 | * | 11/2013 | H04L 1/1864 |
| EP | 3300422 | A1 | * | 3/2018 | H04W 88/085 |
| EP | 3518450 | A1 | * | 7/2019 | H04L 5/1469 |
| EP | 3266138 | B1 | * | 11/2019 | H04L 1/1864 |
| EP | 3319256 | B1 | * | 1/2020 | H04W 28/04 |
| EP | 3518450 | B1 | * | 12/2022 | H04W 72/23 |
| ES | 2656160 | T3 | * | 2/2018 | H04W 72/21 |
| JP | 5010481 | B2 | * | 8/2012 | A47C 7/383 |
| JP | 2015502671 | A | * | 1/2015 | H04W 72/23 |
| JP | 2016503611 | A | * | 2/2016 | H04L 5/0044 |
| JP | 2018507636 | A | * | 3/2018 | H04L 1/1896 |
| JP | 2018509834 | A | * | 4/2018 | H04L 1/1825 |
| JP | 6405335 | B2 | * | 10/2018 | H04W 72/21 |
| JP | 2022537626 | A | * | 8/2022 | H04L 1/1861 |
| JP | 7317719 | B2 | * | 7/2023 | H04W 72/0446 |
| JP | 2023536355 | A | * | 8/2023 | H04W 4/06 |
| JP | 7777120 | B2 | * | 11/2025 | H04L 1/1812 |
| KR | 20070080191 | A | * | 8/2007 | H04B 7/2621 |
| KR | 20100108514 | A | * | 10/2010 | H04L 1/1671 |
| KR | 20100130138 | A | * | 12/2010 | H04L 5/0007 |
| KR | 101084127 | B1 | * | 11/2011 | A47C 7/383 |
| KR | 20110138741 | A | * | 12/2011 | H04W 72/21 |
| KR | 101600408 | B1 | * | 3/2016 | H04L 1/1812 |
| KR | 101701305 | B1 | * | 2/2017 | H04W 72/21 |
| KR | 20190032553 | A | * | 3/2019 | H04W 72/23 |
| KR | 10-2020-0106742 | | | 9/2020 | |
| KR | 102221299 | B1 | * | 3/2021 | H04W 72/23 |
| KR | 102241575 | B1 | * | 4/2021 | H04W 72/23 |
| KR | 102533829 | B1 | * | 5/2023 | H04L 1/1607 |
| KR | 102624583 | B1 | * | 1/2024 | H04L 1/1812 |
| RU | 2013126480 | A | * | 12/2014 | H04W 52/325 |
| WO | WO-2009098892 | A1 | * | 8/2009 | H04L 1/1819 |
| WO | WO-2011020215 | A1 | * | 2/2011 | H04W 72/04 |
| WO | WO-2011037503 | A1 | * | 3/2011 | H04L 1/1854 |
| WO | WO-2016144672 | A2 | * | 9/2016 | H04L 1/1812 |
| WO | WO-2017119771 | A1 | * | 7/2017 | H04L 1/08 |
| WO | WO-2017213397 | A1 | * | 12/2017 | H04L 1/18 |
| WO | WO-2018227099 | A1 | * | 12/2018 | H04W 72/20 |
| WO | WO-2021007237 | A1 | * | 1/2021 | H04W 72/30 |
| WO | WO-2021029557 | A1 | * | 2/2021 | H04W 72/20 |
| WO | WO-2022124641 | A1 | * | 6/2022 | H04L 5/0055 |
| WO | WO-2022212981 | A1 | * | 10/2022 | H04L 1/1861 |
| WO | WO-2023204500 | A1 | * | 10/2023 | H04W 72/11 |

OTHER PUBLICATIONS

Korean Intellectual Property Office Application No. 10-2023-7012923, Office Action dated Jan. 5, 2026, 6 pages.

* cited by examiner

480

| Access Code | Header | Payload |
|---|---|---|

| Preamble | Sync Word | Trailer | LT_ADDR | TYPE | FLOW | ARQN | SEQN | HEC | LLID | FLOW | LENGTH | DATA |
|---|---|---|---|---|---|---|---|---|---|---|---|---|

310 Demultiplexer 370 audio processing device

Figure 14:
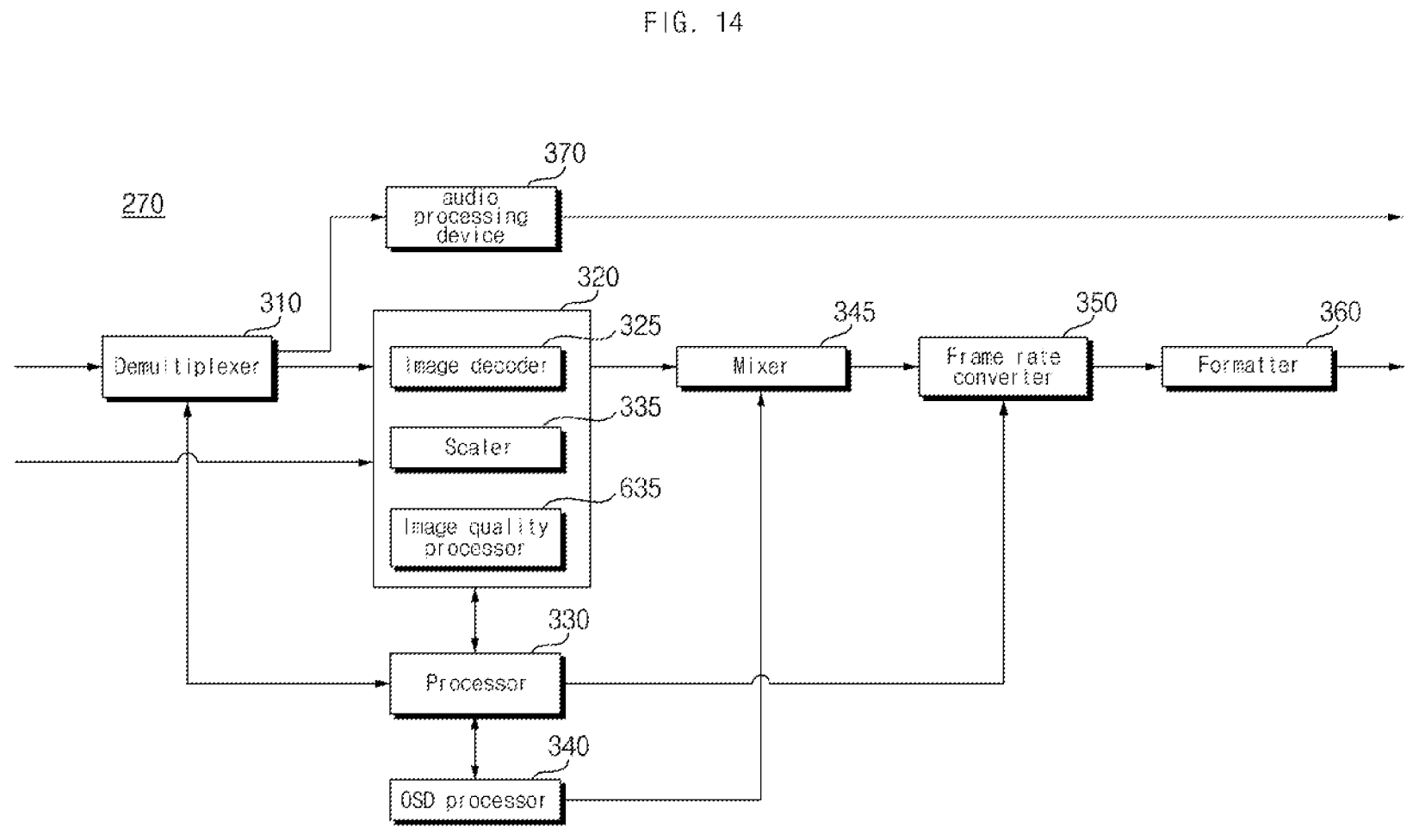

320

325 Image decoder

335 Scaler

635 Image quality processor

345 Mixer

350 Frame rate converter

360 Formatter

330 Processor

340 OSD processor

WIRELESS SOUND OUTPUT DEVICE AND WIRELESS SOUND OUTPUT SYSTEM COMPRISING SAME

CROSS-REFERENCE TO RELATED APPLICATION(S)

This application is the National Stage filing under 35 U.S.C. 371 of International Application No. PCT/KR2020/014615, filed on Oct. 23, 2020, the contents of which is hereby incorporated by reference herein in its entirety.

BACKGROUND

1. Field

The present disclosure relates to a wireless sound output device and a wireless sound output system including the same, and more particularly, to a wireless sound output device that can reduce data transmission delay between audio receiving devices and strengthen security and a wireless sound output system including the same.

2. Description of the Related Art

A wireless sound output device receives an audio signal wirelessly from a wireless audio transmitting device and converts the received audio signal into a sound output. Meanwhile, U.S. Pat. No. 8,768,252 (hereinafter, referred to as "Prior Art Document 1" discloses a first wireless receiving device and a second wireless receiving device which receive a wireless audio signal from an audio source. When transmitting data from the second wireless receiving device to the first wireless receiving device, acknowledgement (ACK) and non-acknowledgement (NACK) data within a Bluetooth communication-based controller layer is transmitted.

However, according to Prior Art Document 1, when transmitting data from the second wireless receiving device to the first wireless receiving device, a Bluetooth communication-based controller layer is used, which may be confused with the use of a controller layer based on Bluetooth communication between the first wireless receiving device and the audio source and therefore increase the likelihood of low security.

Meanwhile, U.S. Pat. No. 10,425,737 (hereinafter, referred to as "Prior Art Document 2") discloses a plurality of audio output devices that receive an audio signal from a source device. When transmitting data between the plurality of audio output devices, acknowledgement (ACK) and non-acknowledgement (NACK) data within a profile layer is transmitted.

However, according to Prior Art Document 2, the transmission of acknowledgement (ACK) and non-acknowledgement (NACK) data within the profile layer which is a higher layer has the drawback of causing a considerable amount of data delay.

SUMMARY

It is an object of the present disclosure to provide a wireless sound output device that can reduce data transmission delay between audio receiving devices and strengthen security and a wireless sound output system including the same.

It is another object of the present disclosure to provide a wireless sound output device that can reduce packet loss in data transmission between audio receiving devices and a wireless sound output system including the same.

In accordance with an aspect of the present disclosure, a wireless sound output device includes: a first audio receiving device configured to receive data from an audio transmitting device; a second audio receiving device configured to receive data from the audio transmitting device or from the first audio receiving device, wherein the second audio receiving device transmits response data to the first audio receiving device based on the received data, wherein packet data of a controller layer of the response data includes an access code and a header, wherein the access code includes a device ID, and the header includes type information.

Meanwhile, the first audio receiving device may form a multicast link with the audio transmitting device, receive at least one media packet from the audio transmitting device via the multicast link, and perform bidirectional communication with the audio transmitting device, and the second audio receiving device may join in the multicast link, receive a media packet from the audio transmitting device via the multicast link, perform unidirectional communication with the audio transmitting device, and perform at least one of unidirectional communication and bidirectional communication with the first audio receiving device. Accordingly, data transmission delay between the audio receiving devices can be reduced, and security can be strengthened.

Meanwhile, the second audio receiving device may transmit the response data to the first audio receiving device after the transmission of the media packet from the audio transmitting device.

Meanwhile, the packet data of the controller layer of the response data may further include a payload, wherein the payload includes packet data of a host layer, wherein the packet data of the host layer includes acknowledgement (ACK) or non-acknowledgement (NACK) data.

Meanwhile, the response data may include packet data of a profile layer, the packet data of the host layer which is a layer underlying the profile layer, and the packet data of the controller layer which is a layer underlying the host layer.

Meanwhile, the second audio receiving device may transmit the acknowledgement (ACK) or non-acknowledgement (NACK) data of the host layer as the response data to the first audio receiving device.

Meanwhile, in the case of a failure to receive data from the audio transmitting device, the first audio receiving device may transmit retransmission request data to the audio transmitting device, wherein the retransmission request data includes the non-acknowledgement (NACK) data of the host layer.

Meanwhile, in case in which the second audio receiving device fails to receive data from the audio transmitting device or from the first audio receiving device, the first audio receiving device may transmit retransmission request data to the audio transmitting device, wherein the retransmission request data includes the non-acknowledgement (NACK) data of the host layer.

Meanwhile, in case in which the second audio receiving device fails to receive data from the audio transmitting device or from the first audio receiving device, the second audio receiving device may transmit the non-acknowledgement (NACK) data of the host layer to the first audio receiving device, and the first audio receiving device may transmit retransmission request data including the non-acknowledgement (NACK) data of the host layer to the audio transmitting device.

Meanwhile, the access code may further include a preamble, and the header may further include acknowledge indication information and sequence information.

Meanwhile, the packet data of the controller layer of the response data may further include a payload, wherein the payload includes length information, type information, sequence information, and acknowledgment (ACK) or non-acknowledgement (NACK) data.

In accordance with another aspect of the present disclosure, a wireless sound output device may include: a first audio receiving device configured to receive data of a first format from the audio transmitting device; and a second audio receiving device configured to receive data of the first format from the audio transmitting device or from the first audio receiving device, wherein the second audio receiving device transmits response data of the first format to the first audio receiving device based on the received data, wherein packet data of a controller layer of the response data includes an access code and a header, wherein the access code includes a device ID, and the header includes type information.

Meanwhile, the packet data of the controller layer of the response data may further include a payload, wherein the payload includes packet data of a host layer, wherein the packet data of the host layer includes acknowledgement (ACK) or non-acknowledgement (NACK) data.

Meanwhile, the second audio receiving device may transmit the acknowledgement (ACK) or non-acknowledgement (NACK) data of the host layer overlying the controller layer as the response data to the first audio receiving device.

In accordance with yet another aspect of the present disclosure, a wireless sound output device may include: a first audio receiving device configured to receive data of a first format from the audio transmitting device; and a second audio receiving device configured to receive data of the first format from the audio transmitting device or from the first audio receiving device, wherein the second audio receiving device transmits response data of a second format which is different than the first format to the first audio receiving device based on the received data, wherein packet data of a controller layer of the response data includes an access code and a header, wherein the access code includes a device ID, and the header includes type information.

Meanwhile, the packet data of the controller layer of the response data may further include a payload, wherein the payload includes packet data of a host layer, wherein the packet data of the host layer includes acknowledgement (ACK) or non-acknowledgement (NACK) data.

Meanwhile, the second audio receiving device may transmit the acknowledgement (ACK) or non-acknowledgement (NACK) data of the host layer overlying the controller layer as the response data to the first audio receiving device.

In accordance with a further aspect of the present disclosure, a wireless sound output system may include: an audio transmitting device; and a wireless sound output device, wherein the wireless sound output device includes: a first audio receiving device configured to receive data from an audio transmitting device; a second audio receiving device configured to receive data from the audio transmitting device or from the first audio receiving device, wherein the second audio receiving device transmits response data to the first audio receiving device based on the received data, wherein packet data of a controller layer of the response data includes an access code and a header, wherein the access code includes a device ID, and the header includes type information.

Meanwhile, after a wireless connection between the audio transmitting device and the first audio receiving device, the second audio receiving device may transmit response data to the first audio receiving device.

Effects of the Disclosure

A wireless sound output device according to an embodiment of the present disclosure may include: a first audio receiving device configured to receive data from an audio transmitting device; a second audio receiving device configured to receive data from the audio transmitting device or from the first audio receiving device, wherein the second audio receiving device transmits response data to the first audio receiving device based on the received data, wherein packet data of a controller layer of the response data includes an access code and a header, wherein the access code includes a device ID, and the header includes type information. Accordingly, data transmission delay between the audio receiving devices can be reduced, and security can be strengthened. In particular, when transmitting response data from the second audio receiving device to the first audio receiving device, data transmission delay can be reduced, and security can be strengthened.

Meanwhile, unnecessary parameters may be eliminated by setting a new data packet format for the controller layer, and packet loss and data transmission loss can be reduced by adding new parameters, i.e., the device ID and the type information. Accordingly, data transmission delay between the audio receiving devices can be reduced, and security can be strengthened.

Meanwhile, the first audio receiving device may form a multicast link with the audio transmitting device, receive at least one media packet from the audio transmitting device via the multicast link, and perform bidirectional communication with the audio transmitting device, and the second audio receiving device may join in the multicast link, receive a media packet from the audio transmitting device via the multicast link, perform unidirectional communication with the audio transmitting device, and perform at least one of unidirectional communication and bidirectional communication with the first audio receiving device. Accordingly, data transmission delay between the audio receiving devices can be reduced, and security can be strengthened.

Meanwhile, the second audio receiving device may transmit the response data to the first audio receiving device after the transmission of the media packet from the audio transmitting device. Accordingly, data transmission delay between the audio receiving devices can be reduced, and security can be strengthened.

Meanwhile, the packet data of the controller layer of the response data may further include a payload, wherein the payload includes packet data of a host layer, wherein the packet data of the host layer includes acknowledgement (ACK) or non-acknowledgement (NACK) data. Accordingly, data transmission delay between the audio receiving devices can be reduced, and security can be strengthened.

Meanwhile, the response data may include packet data of a profile layer, the packet data of the host layer which is a layer underlying the profile layer, and the packet data of the controller layer which is a layer underlying the host layer. Accordingly, data transmission delay between the audio receiving devices can be reduced, and security can be strengthened.

Meanwhile, the second audio receiving device may transmit the acknowledgement (ACK) or non-acknowledgement (NACK) data of the host layer as the response data to the first audio receiving device. Accordingly, data transmission delay between the audio receiving devices can be reduced, and security can be strengthened.

Meanwhile, in the case of a failure to receive data from the audio transmitting device, the first audio receiving device may transmit retransmission request data to the audio transmitting device, wherein the retransmission request data includes the non-acknowledgement (NACK) data of the host layer. Accordingly, data transmission delay between the audio receiving devices can be reduced, and security can be strengthened. Accordingly, data can be received again from the audio transmitting device.

Meanwhile, in case in which the second audio receiving device fails to receive data from the audio transmitting device or from the first audio receiving device, the first audio receiving device may transmit retransmission request data to the audio transmitting device, wherein the retransmission request data includes the non-acknowledgement (NACK) data of the host layer. Accordingly, data can be received again from the audio transmitting device.

Meanwhile, in case in which the second audio receiving device fails to receive data from the audio transmitting device or from the first audio receiving device, the second audio receiving device may transmit the non-acknowledgement (NACK) data of the host layer to the first audio receiving device, and the first audio receiving device may transmit retransmission request data including the non-acknowledgement (NACK) data of the host layer to the audio transmitting device. Accordingly, data can be received again from the audio transmitting device.

Meanwhile, the access code may further include a preamble, and the header may further include acknowledge indication information and sequence information. Accordingly, data transmission delay between the audio receiving devices can be reduced, and security can be strengthened.

Meanwhile, the packet data of the controller layer of the response data may further include a payload, wherein the payload includes length information, type information, sequence information, and acknowledgment (ACK) or non-acknowledgement (NACK) data. Accordingly, data transmission delay between the audio receiving devices can be reduced, and security can be strengthened.

A wireless sound output device according to another embodiment of the present disclosure may include: a first audio receiving device configured to receive data of a first format from the audio transmitting device; and a second audio receiving device configured to receive data of the first format from the audio transmitting device or from the first audio receiving device, wherein the second audio receiving device transmits response data of the first format to the first audio receiving device based on the received data, wherein packet data of a controller layer of the response data includes an access code and a header, wherein the access code includes a device ID, and the header includes type information.

Meanwhile, the packet data of the controller layer of the response data may further include a payload, wherein the payload includes packet data of a host layer, wherein the packet data of the host layer includes acknowledgement (ACK) or non-acknowledgement (NACK) data. Accordingly, data transmission delay between the audio receiving devices can be reduced, and security can be strengthened.

Meanwhile, the second audio receiving device may transmit the acknowledgement (ACK) or non-acknowledgement (NACK) data of the host layer overlying the controller layer as the response data to the first audio receiving device.

6

Accordingly, data transmission delay between the audio receiving devices can be reduced, and security can be strengthened.

A wireless sound output device according to yet another embodiment of the present disclosure may include: a first audio receiving device configured to receive data of a first format from the audio transmitting device; and a second audio receiving device configured to receive data of the first format from the audio transmitting device or from the first audio receiving device, wherein the second audio receiving device transmits response data of a second format which is different than the first format to the first audio receiving device based on the received data, wherein packet data of a controller layer of the response data includes an access code and a header, wherein the access code includes a device ID, and the header includes type information. Accordingly, data transmission delay between the audio receiving devices can be reduced, and security can be strengthened. In particular, when transmitting response data from the second audio receiving device to the first audio receiving device, data transmission delay can be reduced, and security can be strengthened.

Meanwhile, the packet data of the controller layer of the response data may further include a payload, wherein the payload includes packet data of a host layer, wherein the packet data of the host layer includes acknowledgement (ACK) or non-acknowledgement (NACK) data. Accordingly, data transmission delay between the audio receiving devices can be reduced, and security can be strengthened.

Meanwhile, the second audio receiving device may transmit the acknowledgement (ACK) or non-acknowledgement (NACK) data of the host layer overlying the controller layer as the response data to the first audio receiving device. Accordingly, data transmission delay between the audio receiving devices can be reduced, and security can be strengthened.

A wireless sound output system according to a further embodiment of the present disclosure may include: an audio transmitting device; and a wireless sound output device, wherein the wireless sound output device includes: a first audio receiving device configured to receive data from an audio transmitting device; a second audio receiving device configured to receive data from the audio transmitting device or from the first audio receiving device, wherein the second audio receiving device transmits response data to the first audio receiving device based on the received data, wherein packet data of a controller layer of the response data includes an access code and a header, wherein the access code includes a device ID, and the header includes type information. Accordingly, data transmission delay between the audio receiving devices can be reduced, and security can be strengthened. In particular, when transmitting response data from the second audio receiving device to the first audio receiving device, data transmission delay can be reduced, and security can be strengthened.

Meanwhile, after a wireless connection between the audio transmitting device and the first audio receiving device, the second audio receiving device may transmit response data to the first audio receiving device. Accordingly, data transmission delay between the audio receiving devices can be reduced, and security can be strengthened.

BRIEF DESCRIPTION OF THE DRAWINGS

The above and other objects, features and other advantages of the present disclosure will be more clearly under-

US 12,666,228 B2

Figure 1:
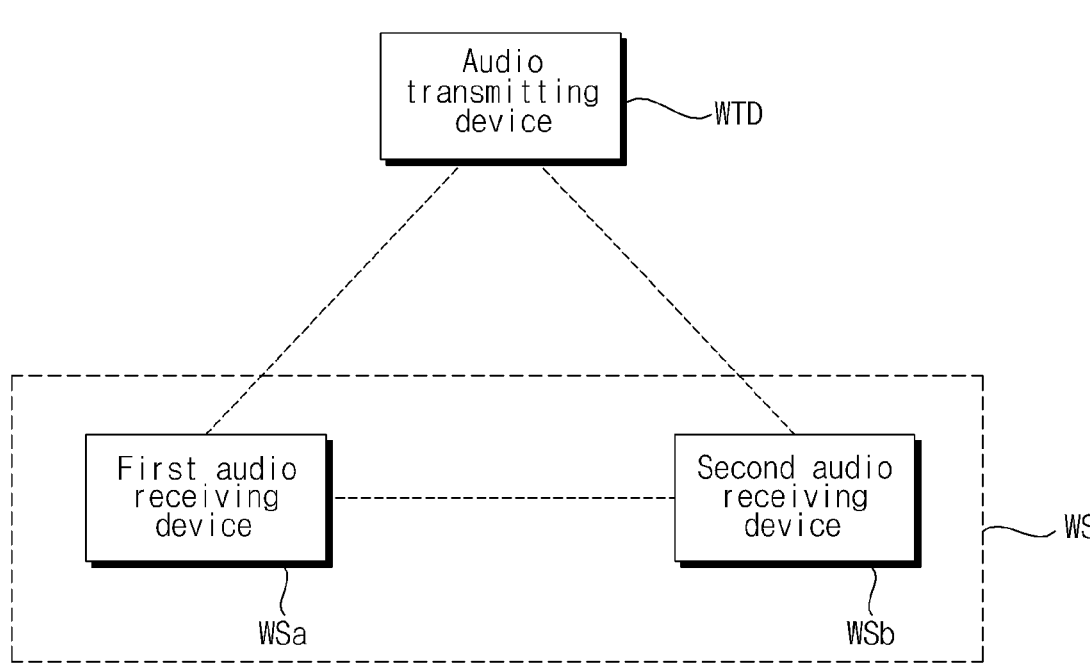

7 stood from the following detailed description taken in conjunction with the accompanying drawings, in which:

FIG. 1 is a view illustrating a wireless sound output system according to an embodiment of the present disclosure.

Figure 2A:
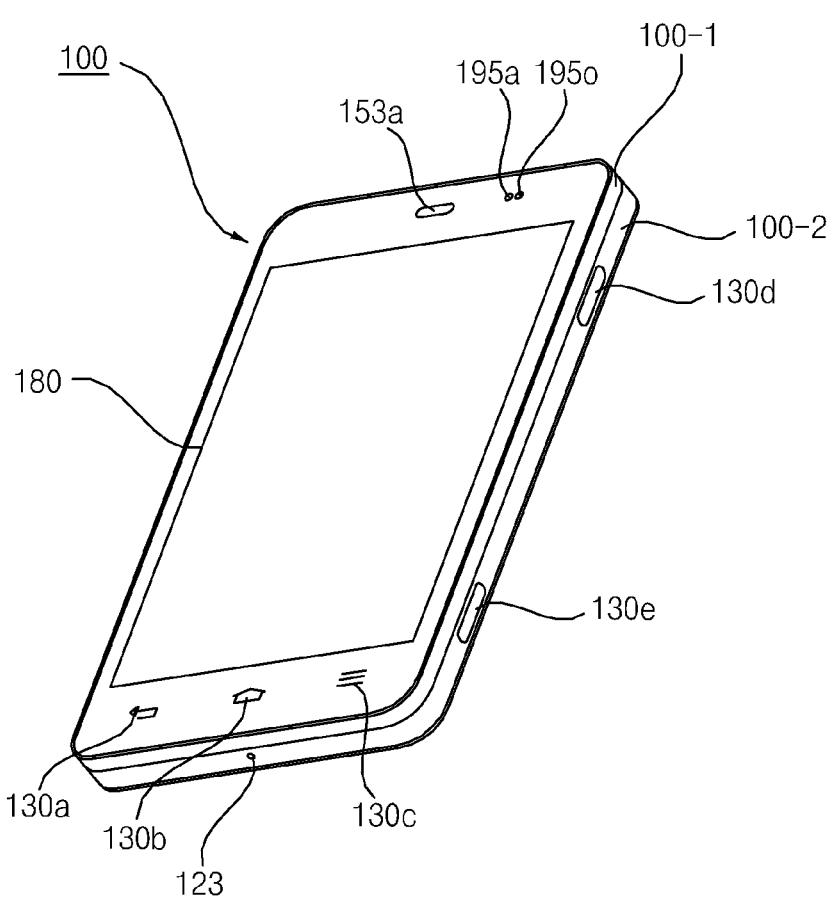

FIG. 2A is a perspective view of a mobile terminal which is an example of the audio transmitting device of FIG. 1, when viewed from the front.

Figure 2B:
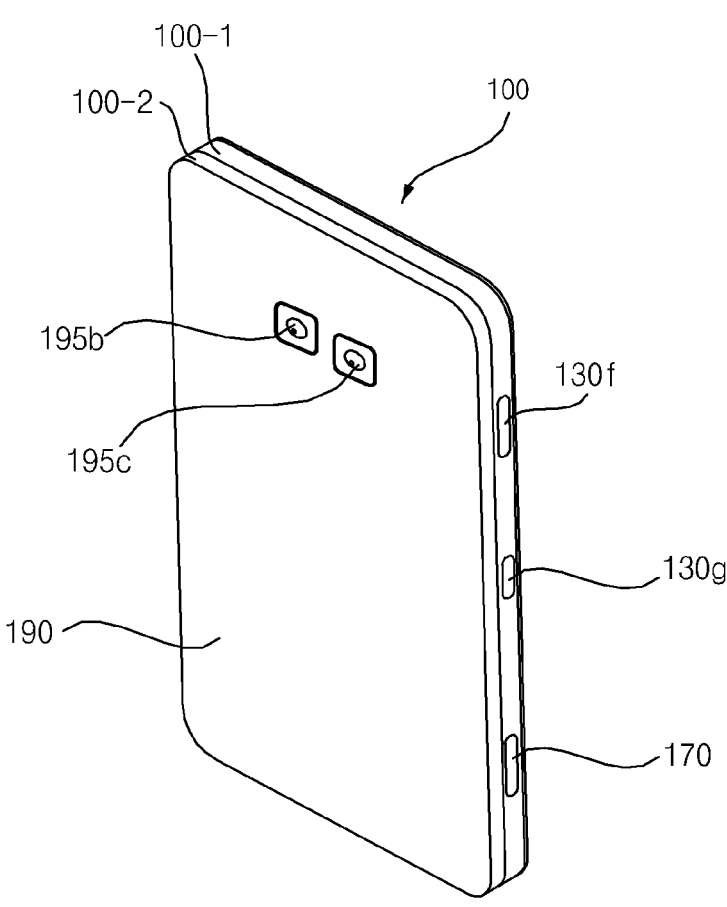

FIG. 2B is a rear perspective view of the mobile terminal shown in FIG. 2A.

Figure 3:
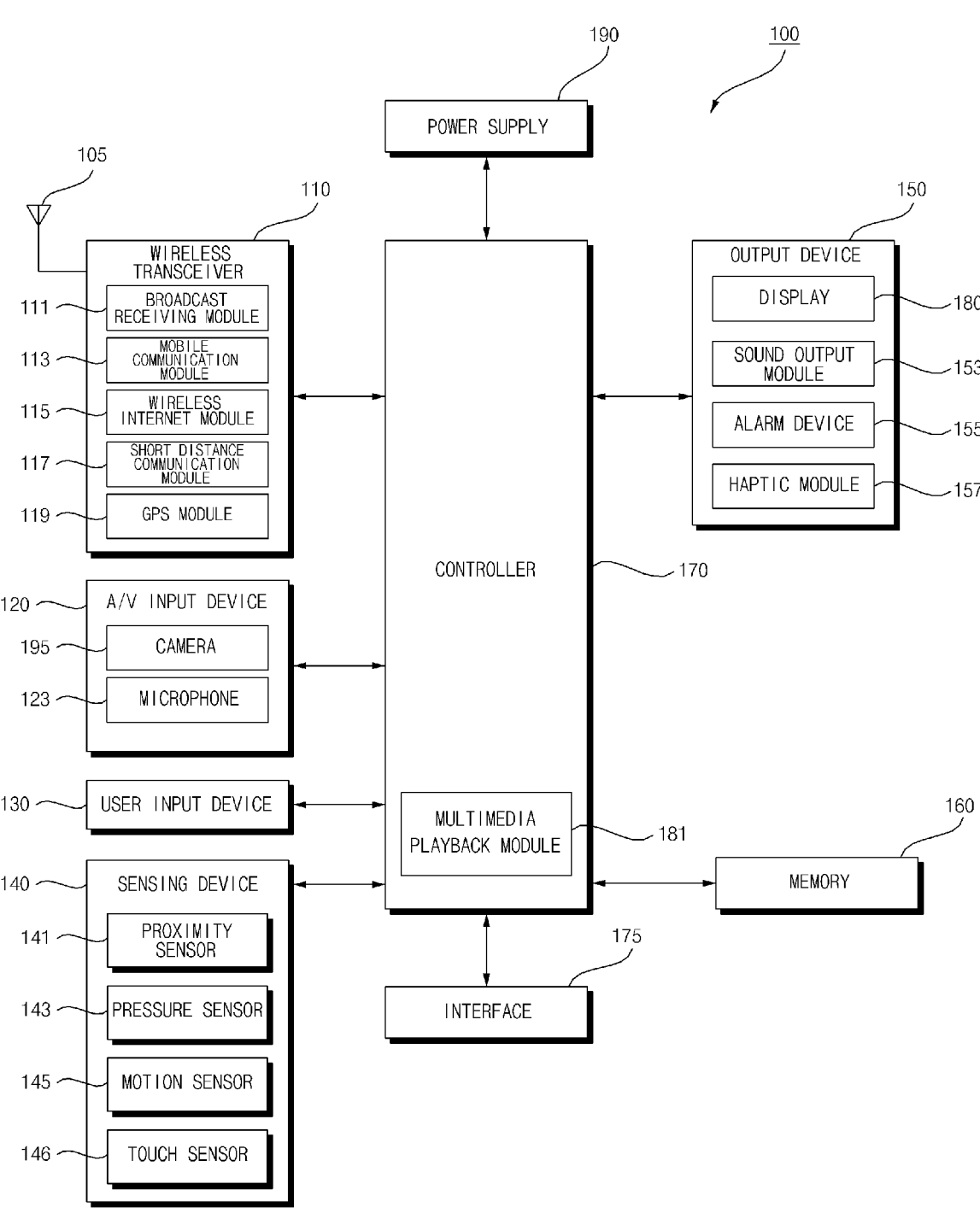

FIG. 3 is a block diagram of the mobile terminal of FIG. 2.

Figure 4A:
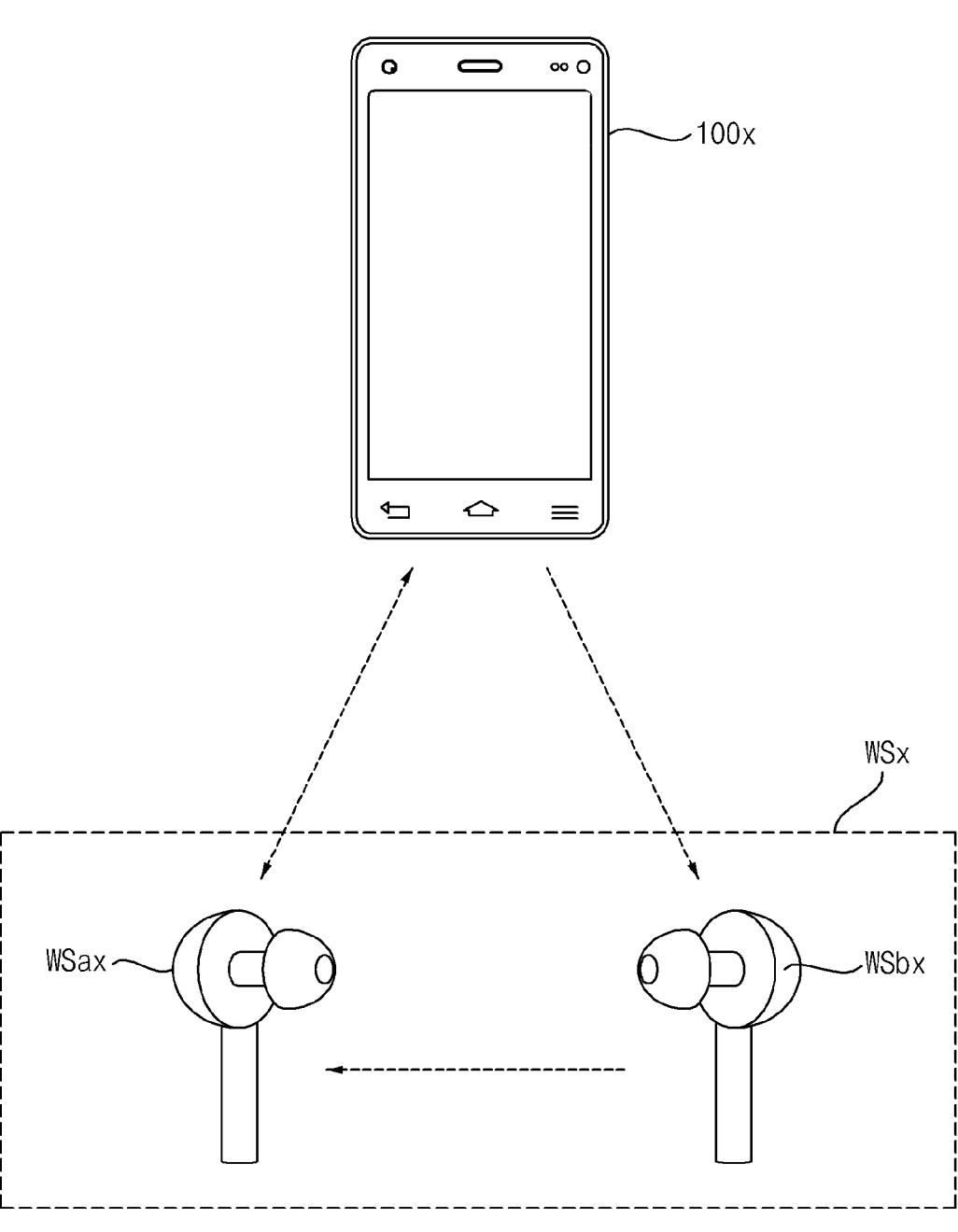
Figure 4B:
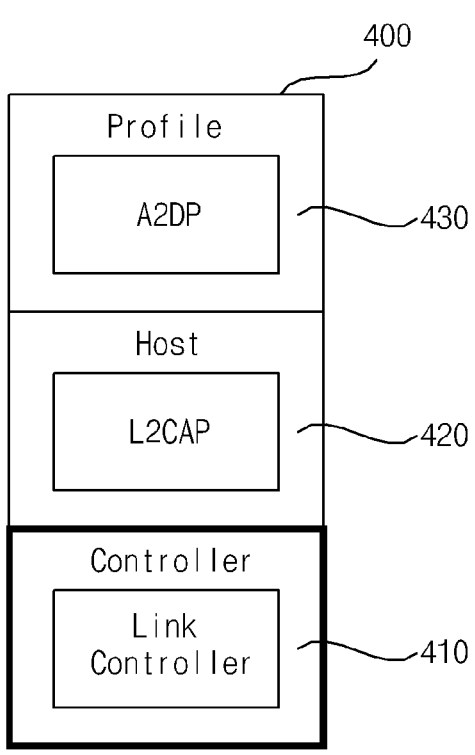
Figure 4C:
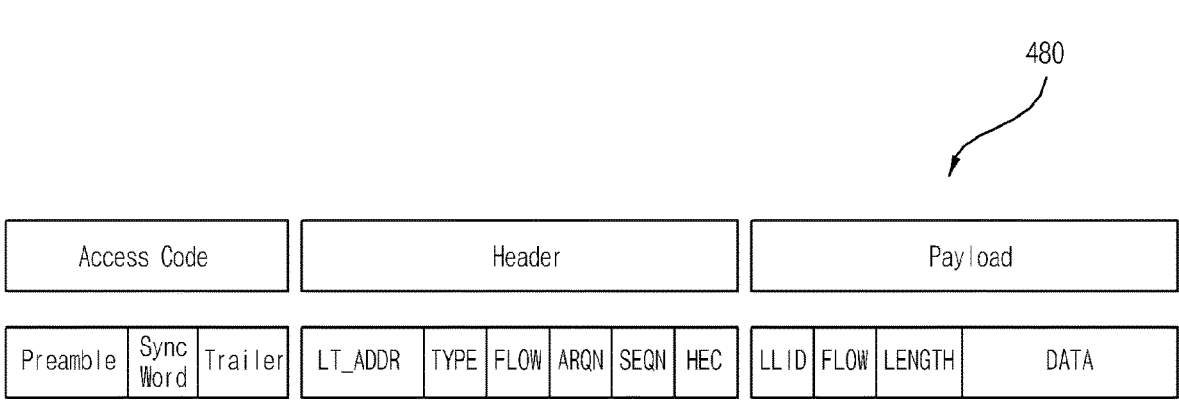

FIGS. 4A to 4C show an example of a wireless sound output system related to the present disclosure.

Figure 5A:
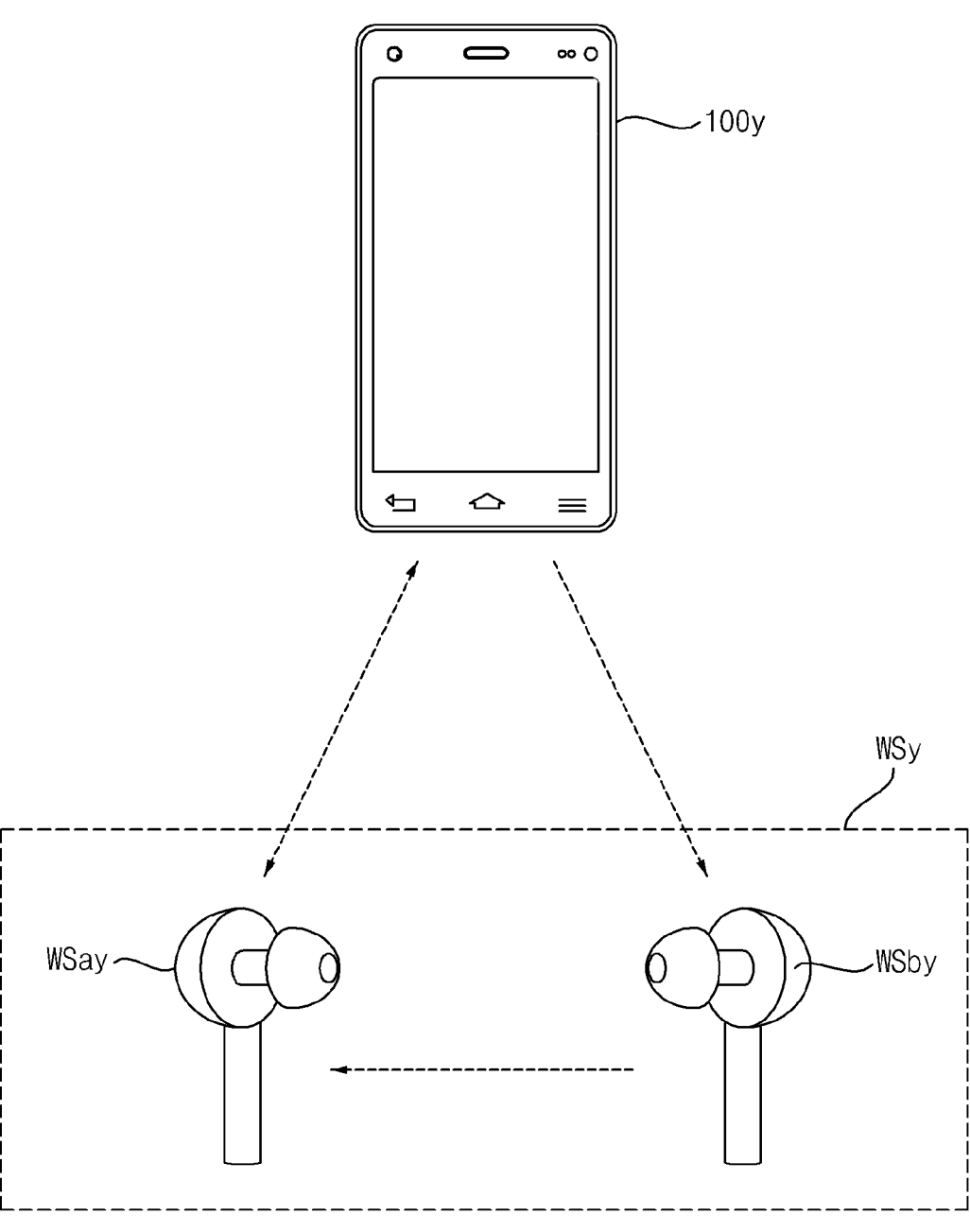
Figure 5B:
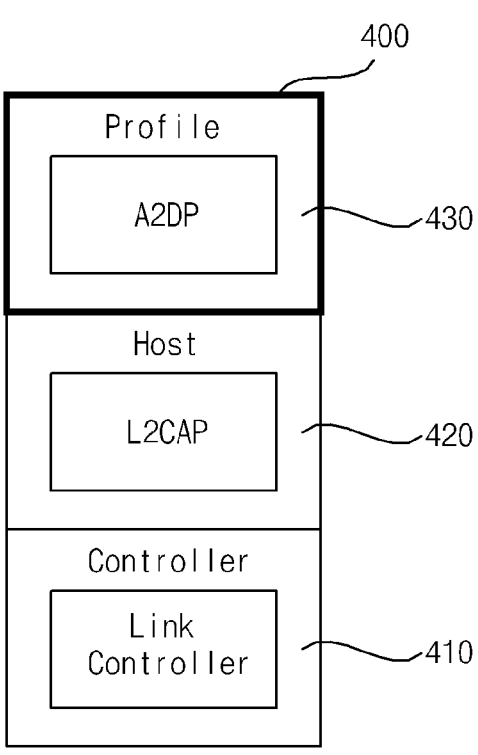
Figure 5C:
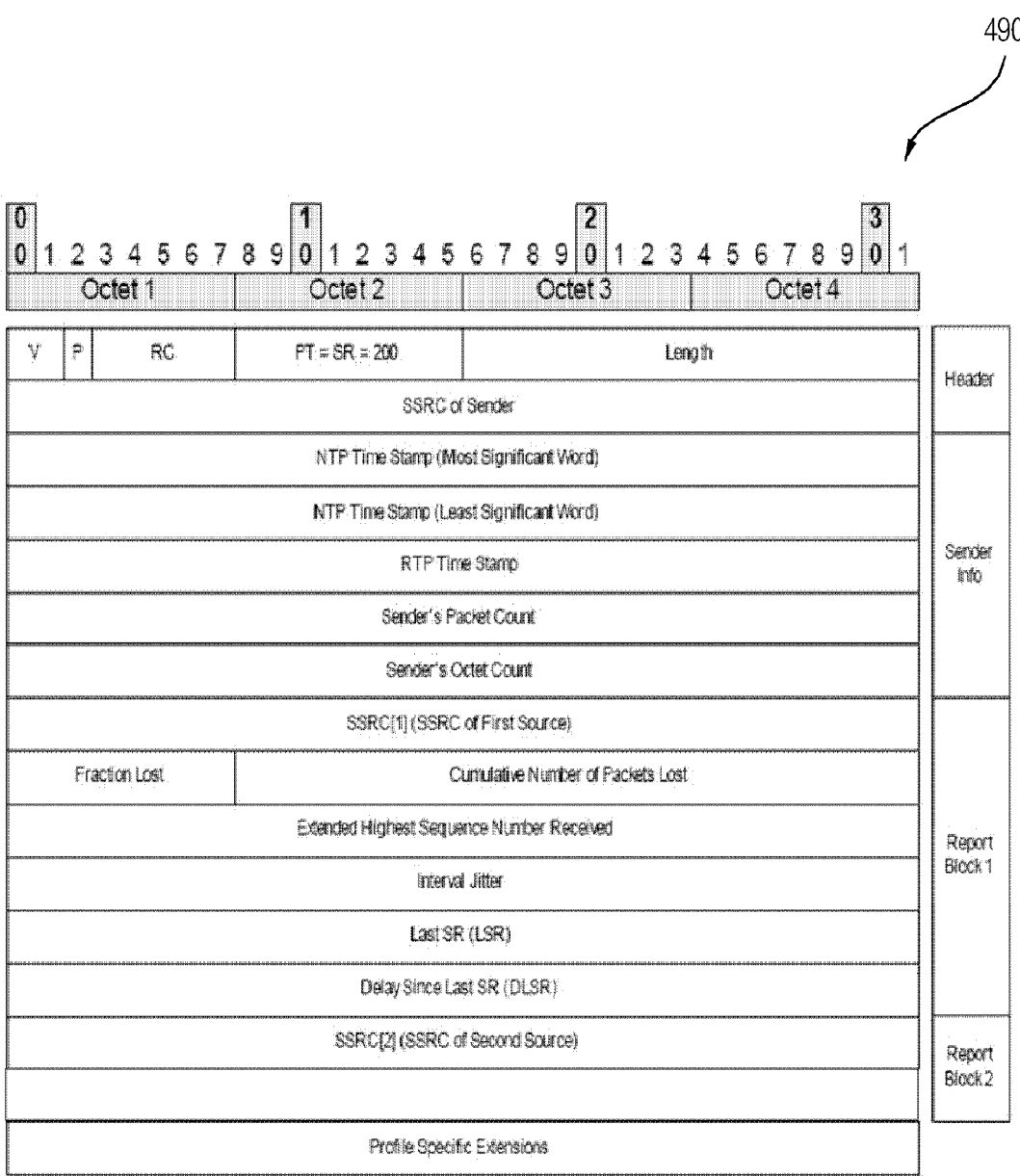

FIGS. 5A to 5C show another example of the wireless sound output system related to the present disclosure.

Figure 6:
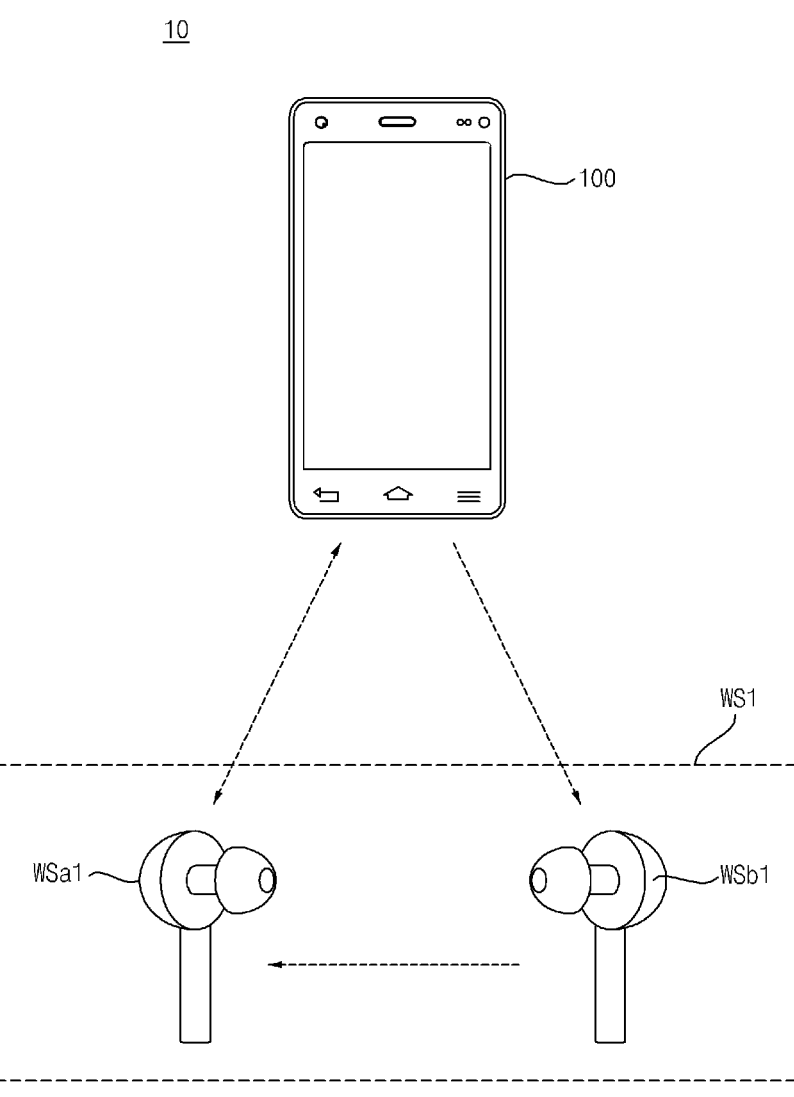

FIG. 6 is a view illustrating a wireless sound output system according to an embodiment of the present disclosure.

Figure 7A:
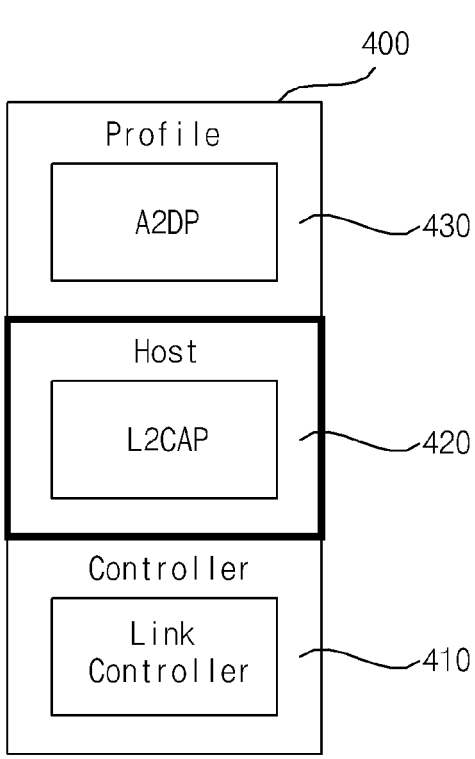
Figure 7B:
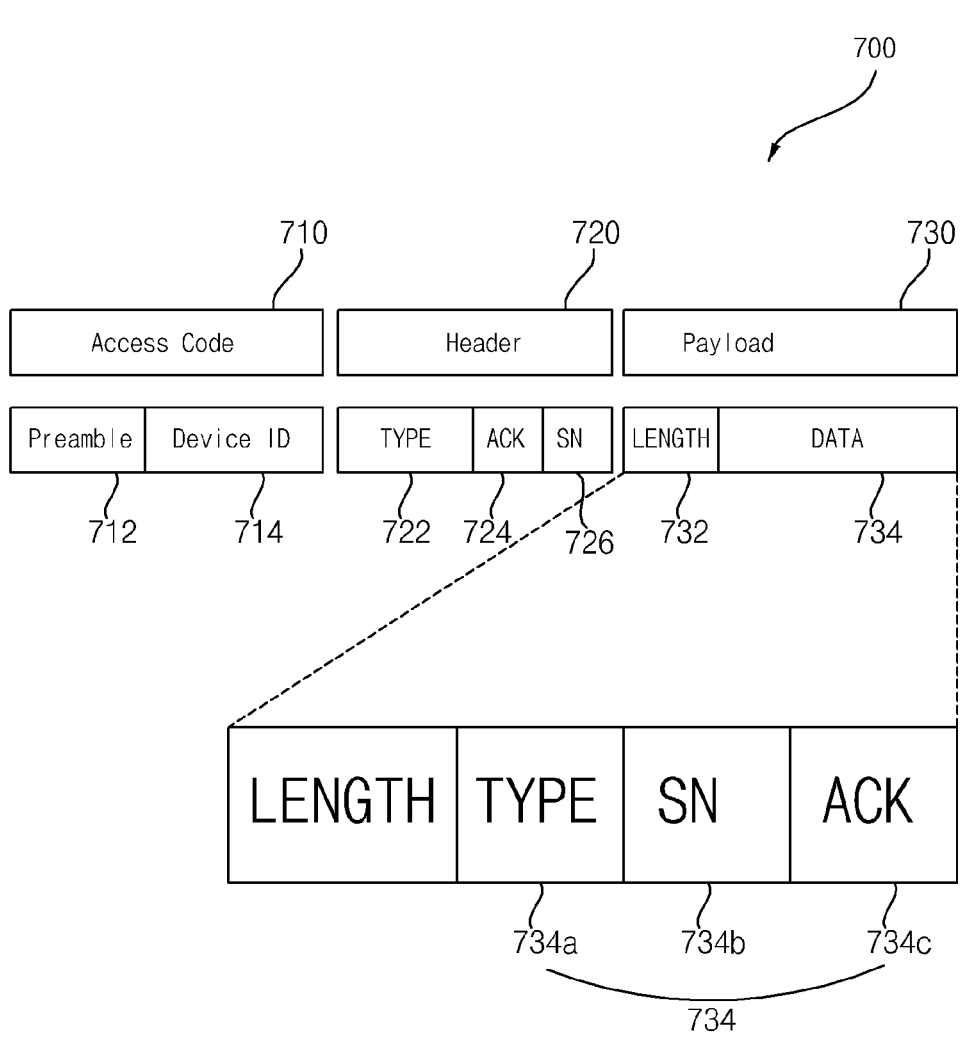
Figure 7C:
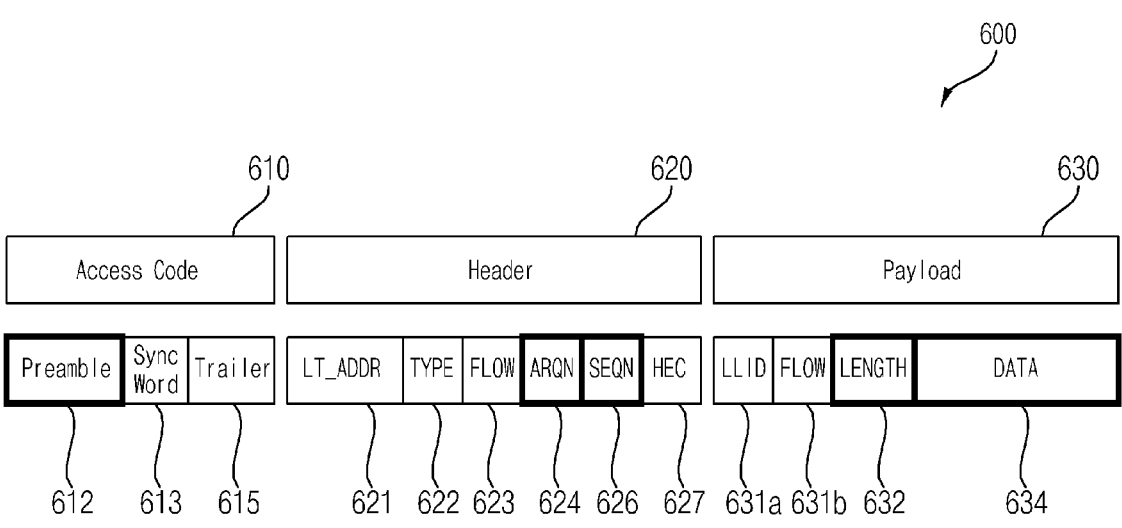

FIGS. 7A to 7C are views referred to for describing FIG. 6.

Figure 8:
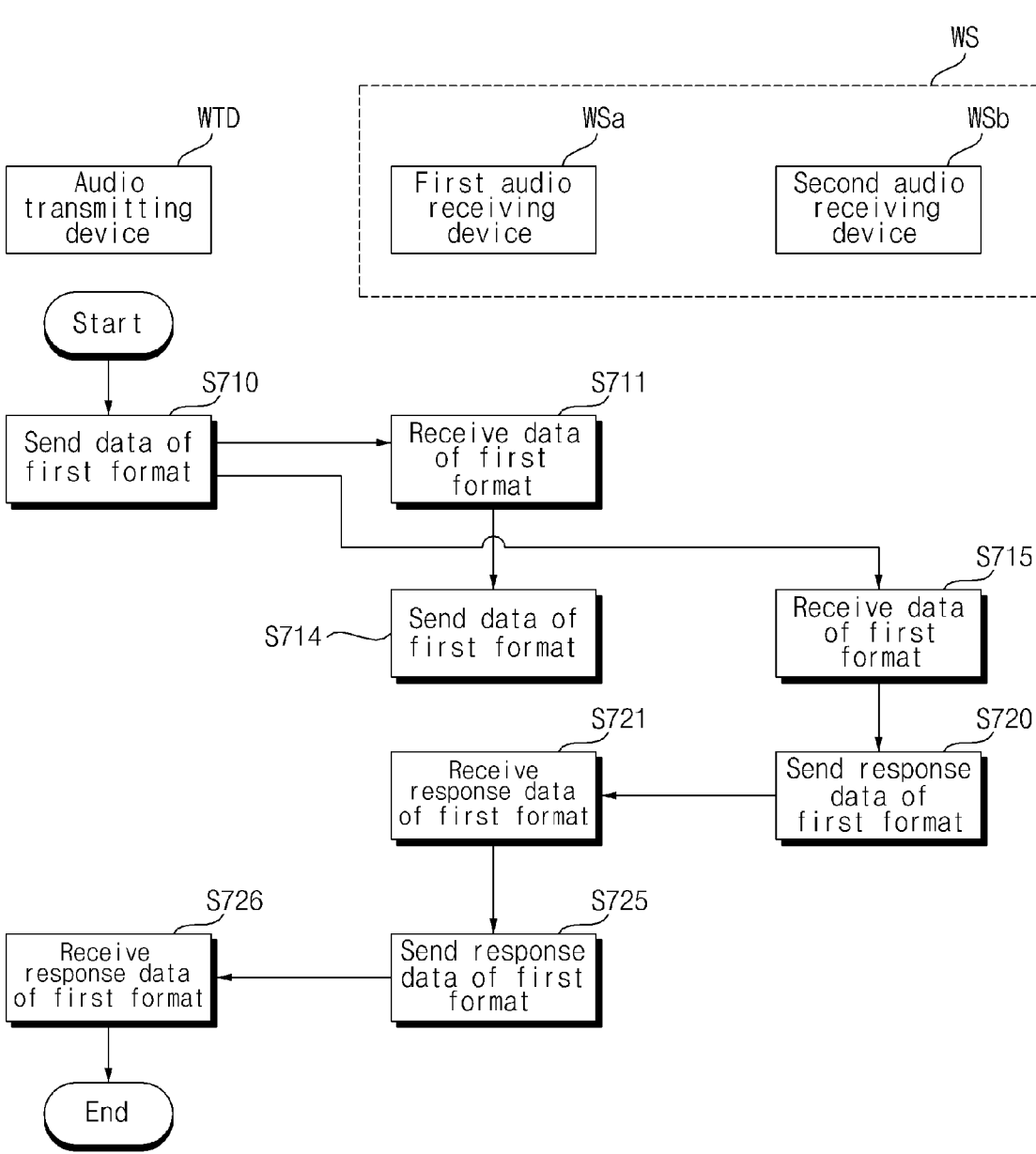

FIG. 8 is a view illustrating an operation method of a wireless sound output system according to an embodiment of the present disclosure.

Figure 9:
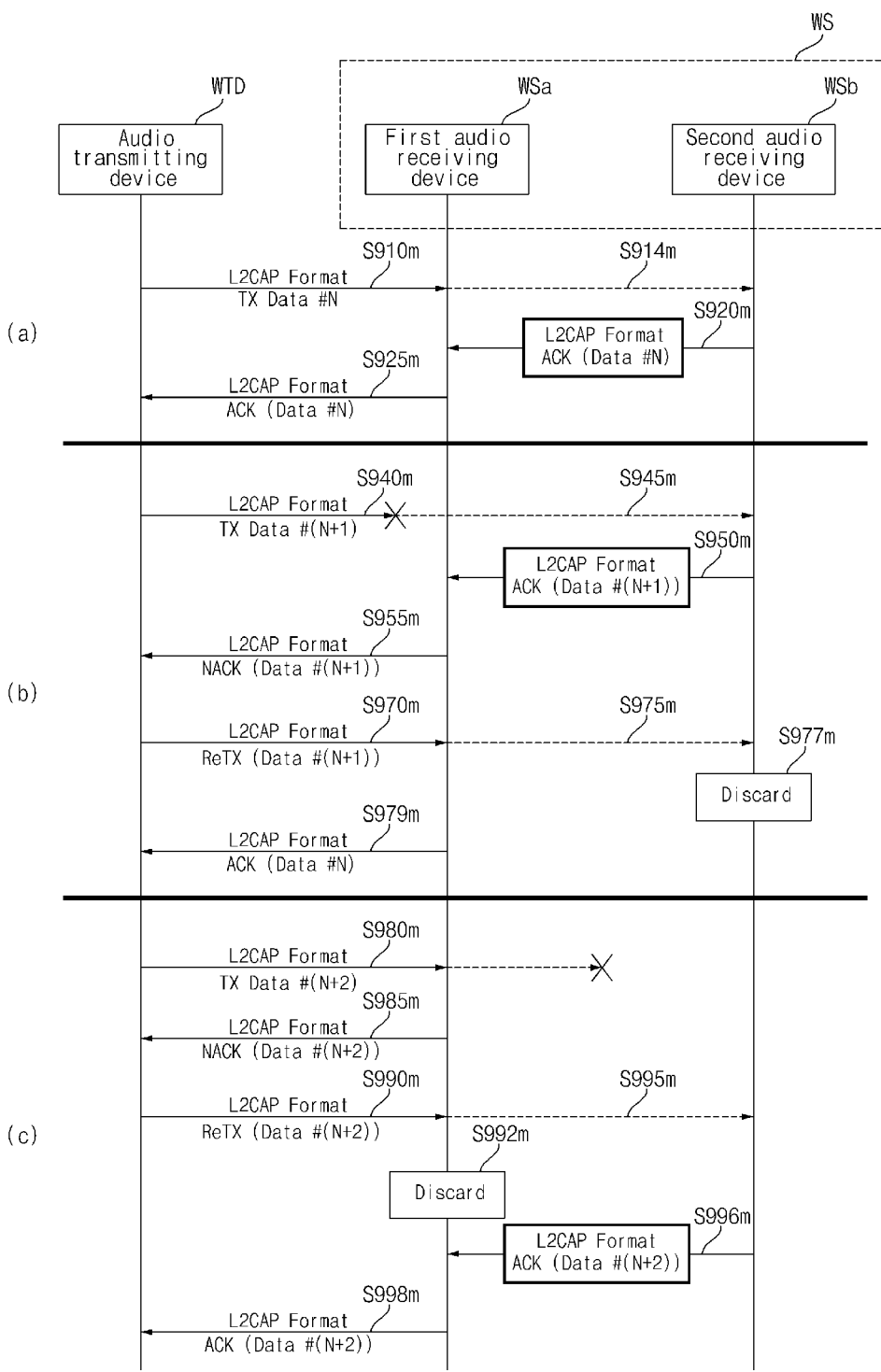

FIG. 9 is a view referred to for describing FIG. 8.

Figure 10:
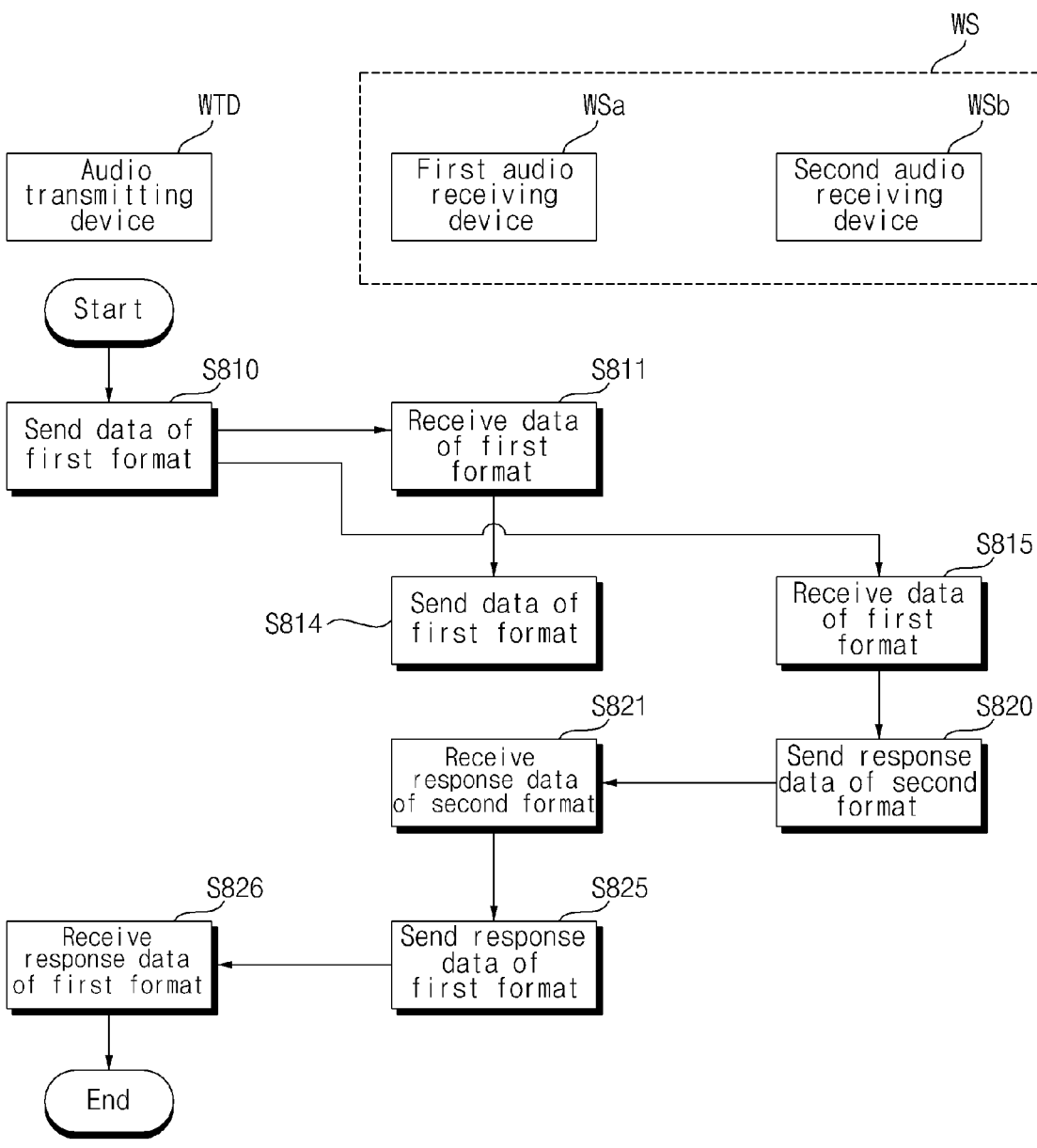

FIG. 10 is a view illustrating an operation method of a wireless sound output system according to another embodiment of the present disclosure.

Figure 11:
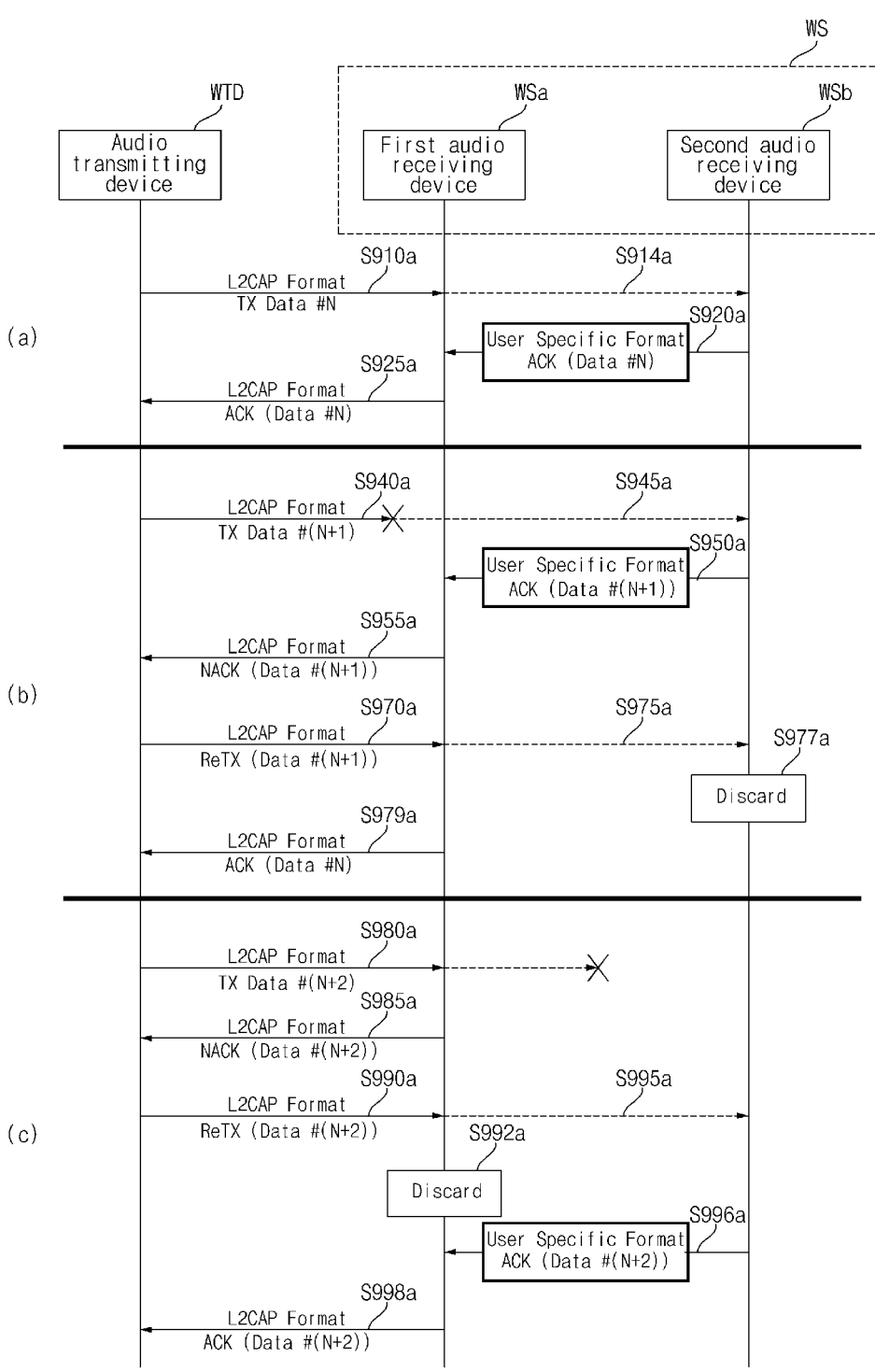

FIG. 11 is a view referred to for describing FIG. 10.

Figure 12:
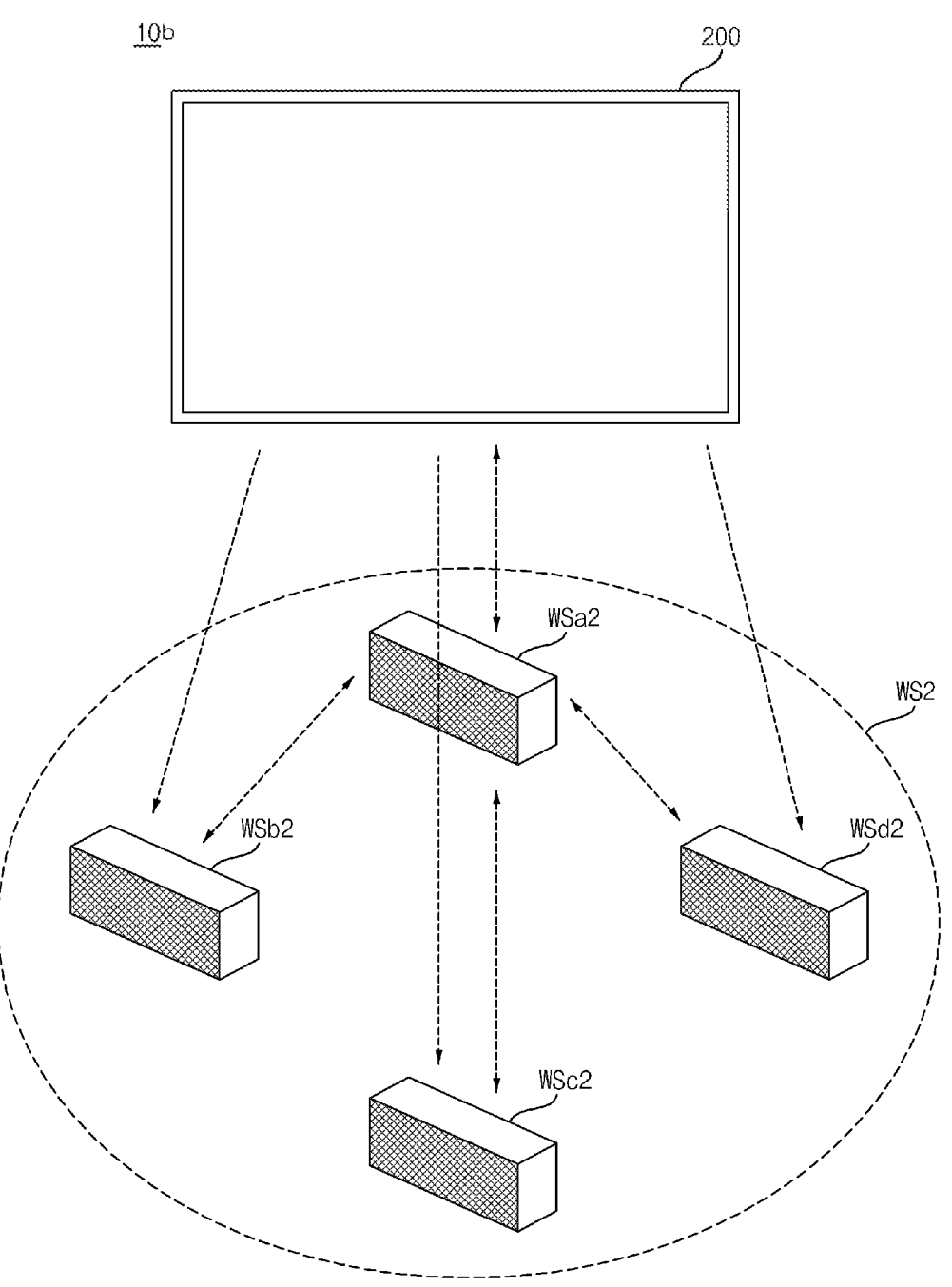

FIG. 12 is a view illustrating a wireless sound output system according to another embodiment of the present disclosure.

Figure 13:
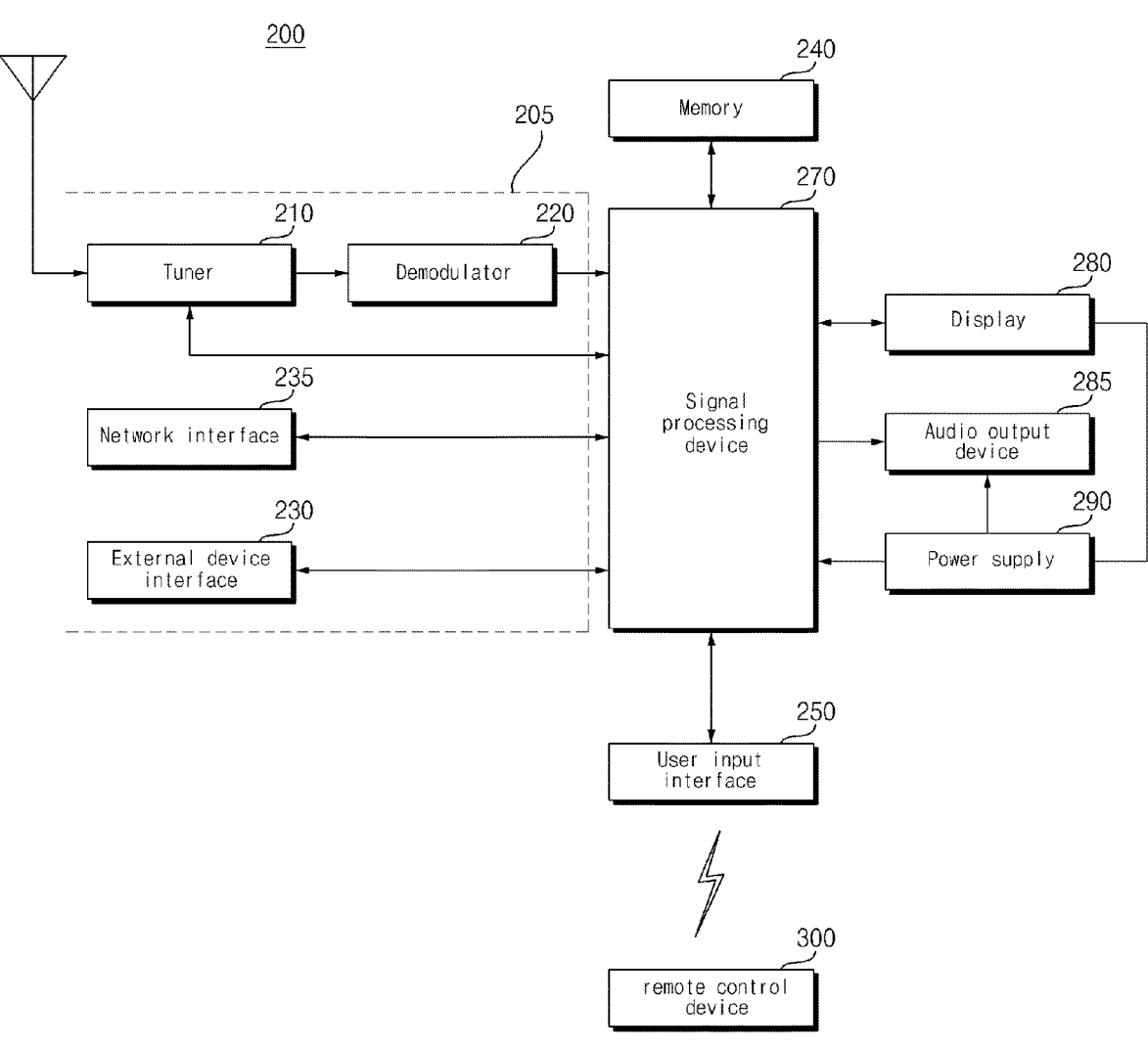

FIG. 13 is an internal block diagram of the image display apparatus of FIG. 12.

FIG. 14 is an internal block diagram of the signal processing device shown in FIG. 13.

DETAILED DESCRIPTION OF THE PREFERRED EMBODIMENTS

Reference will now be made in detail to the preferred embodiments of the present disclosure, examples of which are illustrated in the accompanying drawings.

The suffixes "module" and "unit" in elements used in description below are given only in consideration of ease in preparation of the specification and do not have specific meanings or functions. Therefore, the suffixes "module" and "unit" may be used interchangeably.

FIG. 1 is a view illustrating a wireless sound output system according to an embodiment of the present disclosure.

Referring to the drawing, a wireless sound output system 10 according to an embodiment of the present disclosure may include an audio transmitting device WTD which is an audio source device and a wireless sound output device WS which is an audio synch device.

The wireless sound output device WS may include a plurality of audio receiving devices.

In the drawing, the wireless sound output device WS is illustrated as two audio receiving devices WSa and WSb but not limited thereto, and may include more audio receiving devices.

For example, the wireless sound output device WS, if implemented as wireless earphones, it may be two audio receiving devices WSa and WSb as in the drawing.

As another example, in case in which the wireless sound output device WS is implemented as a 3-channel wireless speaker, the wireless sound output device WS may include three audio receiving devices.

As yet another example, in case in which the wireless sound output device WS is implemented as a 4-channel or 5.1-channel wireless speaker, the wireless sound output device WS may include at least four audio receiving devices.

Meanwhile, in case in which the wireless sound output device WS includes two or more audio receiving devices, one of the two or more audio receiving devices may operate as a master audio receiving device, and the other(s) may operate as a slave audio receiving device.

The master audio receiving device may exchange data with an audio transmitting device which is an audio source device and also exchange data with the slave audio receiving device.

Meanwhile, the slave audio source device WSb may exchange data with the master audio receiving device WSa but not with the audio transmitting device WTD. In particular, when acknowledgement (ACK) or non-acknowledgement (NACK) data is transmitted, data may be exchanged with the master audio receiving device WSa but not with the audio transmitting device WTD.

In this manner, when wireless communication is performed between the audio transmitting device WTD and wireless sound output device WS within the wireless sound output system 10, data transmission delay occurs in the transmission of acknowledgement (ACK) or non-acknowledgement (NACK) data between the audio receiving devices WSa and WSb within the wireless sound output device WS.

Also, when transmitting data between the audio receiving devices WSa and WSb, security may be lowered due to interference between the audio transmitting device WTD and the master audio receiving device WSa.

In view of this, in the present disclosure, a new data packet format is set for data transmission between the audio receiving devices WSa and WSb, in order to reduce data transmission delay between the audio receiving devices and strengthen security.

Meanwhile, unlike Prior Art Document 1 and Prior Art Document 2, unnecessary parameters may be eliminated by setting a new data packet format for a controller layer, and packet loss and data transmission loss can be reduced by adding new parameters, i.e., a device ID and type information.

To this end, the wireless sound output device WS according to an embodiment of the present disclosure includes a first audio receiving device WSa which receives data from an audio transmitting device WTD and a second audio receiving device WSb which receives data from the audio transmitting device WTD or from the first audio receiving device WSa. The second audio receiving device WSb transmits response data to the first audio receiving device WSa based on the received data, packet data 700 of a controller layer 410 of the response data includes an access code 710 and a header 720, the access code 710 includes a device ID 714, and the header 720 includes type information 722.

Accordingly, data transmission delay between the audio receiving devices WSa and WSb can be reduced, and security can be strengthened. Especially, when response data is transmitted from the second audio receiving device WSb to the first audio receiving device WSa, data transmission delay can be reduced, and security can be strengthened.

Meanwhile, the first audio receiving device WSa may form a multicast link with the audio transmitting device WTD, receive at least one media packet from the audio transmitting device WTD via the multicast link, and perform bidirectional communication with the audio transmitting device WTD, and the second audio receiving device WSb may join in the multicast link, receive a media packet from the audio transmitting device WTD via the multicast link, perform unidirectional communication with the audio transmitting device WTD, and perform at least one of unidirectional communication and bidirectional communication with the first audio receiving device WSa. Accordingly, data transmission delay between the audio receiving devices can be reduced, and security may be strengthened.

Meanwhile, the second audio receiving device WSb may transmit the response data to the first audio receiving device WSa after the transmission of the media packet from the audio transmitting device WTD. Accordingly, data transmission delay between the audio receiving devices WSa and WSb can be reduced, and security can be strengthened.

Meanwhile, the audio transmitting device WTD which is an audio source device may be a mobile terminal (100 of FIG. 2A) or an image display apparatus (200 of FIG. 12).

Meanwhile, the wireless sound output system according to an embodiment of the present disclosure will be described in more detail with reference to FIG. 2A and the subsequent drawings.

FIG. 2A is a perspective view of a mobile terminal which is an example of the audio transmitting device of FIG. 1, when viewed from the front. FIG. 2B is a rear perspective view of the mobile terminal shown in FIG. 2A.

Referring to FIG. 2A, a case forming an outer appearance of the mobile terminal 100 is formed by a front case 100-1 and a rear case 100-2. Various electronic components may be embedded in a space formed by the front case 100-1 and the rear case 100-2.

Specifically, a display 180, a first audio output module 153a, a first camera 195a, a second camera 195o, and first to third user input parts 130a, 130b, and 130c may be disposed in the front case 100-1. Also, a fourth user input part 130d, a fifth user input part 130e, and first to third microphones 123a, 123b, and 123c may be disposed on the side of the rear case 100-2.

Since a layered touchpad is placed over the display 180, the display 180 may operate as a touchscreen.

The first audio output module 153a may be implemented in the form of a receiver or speaker. The first camera 195a may be implemented in a manner appropriate for taking an image or video of a user or the like. Also, the microphone 123 may be implemented in a manner appropriate for receiving the user's voice inputs and other sound inputs.

The first to fifth user input parts 130a, 130b, 130c, 130d, and 130e and sixth and seventh user input parts 130f and 130g to be described later may be collectively referred to as a user input device 130.

The first and second microphones 123a and 123b are disposed on the top of the rear case 100-2, i.e., the top of the mobile terminal 100, to collect audio signals, and the third microphone 123c may be disposed on the bottom of the rear case 100-2, i.e., the bottom of the mobile terminal 100, to collect audio signals.

Referring to FIG. 2B, a third camera 195b, a fourth camera 195d, and a fourth microphone (not shown) may be additionally fitted to the backside of the rear case 100-2, and sixth and seventh user input parts 130f and 130g and an interface 175 may be disposed on the side of the rear case 100-2.

The third camera 195b may have a different photographing direction from that of the first camera 195a, and may have a different resolution from that of the first camera 195a. A camera flash (not shown) and a mirror (not shown) may be disposed near the third camera 195b. In addition, another camera may be placed near the third camera 195b and used for capturing a three-dimensional stereoscopic image.

A second audio output module (not shown) may be added to the rear case 100-2. The second audio output module, along with the first audio output module 153a, may implement a stereo function, and also may be used for calls in a speakerphone mode.

A power supply 190 may be fitted to the rear case 100-2 to supply power to the mobile terminal 100. The power supply 190 is a chargeable battery, for example, and may be removably attached to the rear case 100-2 for charging or other uses.

The fourth microphone 123d may be disposed on the front of the rear case 100-2, i.e., the back of the mobile terminal 100, to collect audio signals.

FIG. 3 is a block diagram of the mobile terminal of FIG. 2.

Referring to FIG. 3, the mobile terminal 100 may include a wireless transceiver 110, an audio/video (A/V) input device 120, a user input device 130, a sensing device 140, an output device 150, a memory 160, an interface 175, a controller 170, and a power supply 190. In actual applications, two or more of these components may be combined into a single component, or one component may be divided into two or more components.

The wireless transceiver 110 may include a broadcast receiving module 111, a mobile communication module 113, a wireless internet module 115, a short-range communication module 117, and a GPS module 119.

The broadcast receiving module 111 may receive at least one of a broadcast signal and broadcast-related information from an external broadcast management server through a broadcast channel. The broadcast signal and/or broadcast-related information received through the broadcast receiving module 111 may be stored in the memory 160.

The mobile communication module 113 transmits and receives a wireless signal to and from at least one of a base station, an external terminal, and a server over a mobile communication network. The wireless signal may include a voice call signal, a video call signal, or various types of data associated with transmission and reception of a text/multimedia message.

The wireless Internet module 115 is a module for wireless Internet access. The wireless internet module 115 may be embedded in or external to the mobile terminal 100.

The short-range communication module 117 is a module for short-range communication. Examples of short-range communication technologies may include Bluetooth, RFID (Radio Frequency Identification), IrDA (Infrared Data Association), UWB (Ultra Wideband), ZigBee, NFC (Near Field Communication), and so on.

The GPS (Global Positioning System) module 119 receives location information from a plurality of GPS artificial satellites.

The A/V (Audio/video) input device 120 may be used to receive audio signals or video signals. The A/V input device 120 may include a camera 195 and a microphone 123.

The camera 195 may process various image frames such as still images or moving images captured by an image sensor during a video call mode or an image capturing mode. The processed image frames may be displayed on the display 180.

The image frames processed by the camera 195 may be stored in the memory 160 or may be transmitted to the outside through the wireless transceiver 110. Two or more cameras 195 may be provided depending on the configuration of the electronic device.

The microphone 123 may receive an external audio signal in a display-off mode, for example, a call mode, a recording mode, or a voice recognition module, and process it into electrical audio data.

Meanwhile, a plurality of microphones 123 may be disposed at different positions. Audio signals received by the microphones may be processed by the controller 170 or the like.

The user input device 130 generates key input data that the user inputs to control the operation of the electronic device. The user input device 130 may include a key pad, a dome switch, a (resistive/capacitive) touchpad, and so on which can receive command or information inputs by the user's pressing or touching operation. Especially, a touchpad forming a layered structure with the display 180 which is to be described later may be referred to as a "touchscreen".

The sensing device 140 may sense a current state of the mobile terminal 100, such as whether the mobile terminal 100 is open or closed, the location of the mobile terminal 100, and whether the user is touching it or not, and generate a sensing signal for controlling the operation of the mobile terminal 100.

The sensing device 140 may include a proximity sensor 141, a pressure sensor 143, a motion sensor 145, a touch sensor 146, and so on.

The proximity sensor 141 may detect the presence or absence of an object that is approaching the mobile terminal 100 or is present near the mobile terminal 100 without physical contact. The proximity sensor 141 may detect a nearby object based on a change in AC magnetic fields or a change in magnetostatic fields or based on a variation rate of capacitance.

The pressure sensor 143 may detect whether a pressure is applied to the mobile terminal 100 and the magnitude of such a pressure.

The motion sensor 145 detects the position or motion of the mobile terminal 100 by using an acceleration sensor or a gyro sensor.

The touch sensor 146 may detect a touch input by a user's finger or a touch input by a specific pen. For example, in a case where a touch screen panel is disposed on the display 180, the touch screen panel may include a touch sensor 146 for sensing location information, intensity information, and the like of a touch input. The sensing signal sensed by the touch sensor 146 may be transmitted to the controller 170.

The output device 150 is provided to output an audio or video signal or an alarm signal. The output device 150 may include a display 180, an audio output module 153, an alarm device 155, and a haptic module 157.

The display 180 displays information processed in the mobile terminal 100. For example, in case in which the mobile terminal 100 is in a call mode, the display 180 displays a communication-related User Interface (UI) or Graphical User Interface (GUI). In case in which the mobile terminal 100 is in a video communication mode or an image capture mode, the display 180 may individually or simultaneously display captured or received images and may display a corresponding UI or GUI.

Meanwhile, as described previously, in the case where the display 180 and a touchpad form a layered structure to configure a touchscreen, the display 180 may be used as an input device capable of receiving information by the user's touch, as well as an output device.

The audio output module 153 may output audio data received from the wireless transceiver 110 or stored in the memory 160 during an incoming call receiving mode, a call mode or recording mode, a voice recognition mode, or a broadcast receiving mode. Also, the audio output module 153 outputs audio signals associated with functions performed by the mobile terminal 100, for example, an audio signal associated with an incoming call sound or a message receipt sound. The audio output module 153 may include a speaker, a buzzer, or the like.

The alarm device 155 outputs a signal notifying the user that an event has occurred in the mobile terminal 100. The alarm device 155 outputs a signal notifying the user of the occurrence of an event in a different form from the audio or video signal. For example, the alarm device 155 may output the notification signal through vibration.

The haptic module 157 generates a variety of tactile effects that are sensible by the user. A typical example of the tactile effect generated by the haptic module 157 is vibration. In the case where the haptic module 157 generates vibration as a tactile effect, the haptic module 157 may change the intensity and pattern of generated vibration, may combine different vibrations and output the combined vibration, and may also sequentially output different vibrations.

The memory 160 may store a program for processing and control by the controller 170 and may function to temporarily store input or output data items (for example, a phonebook, messages, still images, and moving images).

The interface 175 functions to interface with all external devices connected to the mobile terminal 100. The interface 175 may receive power or data from an external device and provide the same to each of the components inside the mobile terminal 100, and may transmit internal data of the mobile terminal 100 to the external device.

The controller 170 generally controls the operation of each component to control the overall operation of the mobile terminal 100. For example, the controller 170 performs control and processing associated with voice communication, data communication, video communication, and the like. The controller 170 may include a multimedia playback module 181 for multimedia playback. The multimedia playback module 181 may be configured as hardware in the controller 170 or may be configured as software separately from the controller 170. Meanwhile, the controller 170 may include an application processor (not shown) for running an application. Alternatively, the application processor (not shown) may be provided separately from the controller 170.

Under control of the controller 170, the power supply 190 receives external power or internal power and supplies power required for operation to each component.

FIGS. 4A to 4C show an example of a wireless sound output system related to the present disclosure.

Meanwhile, the wireless sound output system 10x of FIGS. 4A to 4C may correspond to Prior Art Document 1.

First, FIG. 4A illustrates the wireless sound output system 10x related to the present disclosure.

Referring to the drawing, the wireless sound output system 10x may include a mobile terminal 100x which is an audio source device and a wireless sound output device WSx which is an audio synch device.

The wireless sound output device WSx may include two audio receiving devices WSax and WSbx.

FIG. 4B is a view illustrating a data structure transmitted between the audio receiving devices WSax and WSbx of FIG. 4A.

Referring to the drawing, the data structure 400 transmitted between the audio receiving devices WSax and WSbx may include a profile layer 430, a host layer 420 which is a layer underlying the profile layer 430, and a controller layer 410 which is a layer underlying the host layer 420.

Response data transmitted between the audio receiving devices WSax and WSbx may be transmitted by using packet data of the controller layer 410 among them.

FIG. 4C illustrates the packet data 480 of the controller layer 410 of FIG. 4B.

Referring to the drawing, the packet data 480 of the controller layer 410 may include an access code, a header, and a payload.

The access code may include a preamble for DC compensation, a sync word for timing, and a trailer for extended DC compensation.

The header may include LT_ADDR representing a logical transmission address, TYPE representing a type code, FLOW for flow control, ARQN representing acknowledge indication information, SEQN representing sequence information, and HEC for header error check.

The payload may include LLID for logical link identification, FLOW for flow control, LENGTH representing the length of the payload, and DATA.

Meanwhile, when transmitting data from the second audio receiving device WSbx of FIG. 4A to the first audio receiving device WSax, in case in which the controller layer 410 in the data format illustrated in FIG. 4B, which is based on Bluetooth communication, is used, the packet data 480 of the controller layer 410 as shown in FIG. 4C needs to be transmitted, which is disadvantageous since the amount of data to be transmitted is large.

Moreover, in transmitting data from the second audio receiving device WSbx to the first audio receiving device WSax, the data is the same as the packet data 480 of the controller layer 410 which is used for data transmission between the mobile terminal 100x and the first audio receiving device WSax, which may lead to a possible confusion and therefore increase the likelihood of low security.

FIGS. 5A to 5C show another example of the wireless sound output system related to the present disclosure.

Meanwhile, the wireless sound output system 10y of FIGS. 5A to 5C may correspond to Prior Art Document 2.

FIG. 5A illustrates the wireless sound output system 10y related to the present disclosure.

Referring to the drawing, the wireless sound output system 10y may include a mobile terminal 100y which is an audio source device and a wireless sound output device WSy which is an audio sync device.

The wireless sound output device WSy may include two audio receiving devices WSay and WSby.

FIG. 5B is a view illustrating a data structure transmitted between the audio receiving devices WSay and WSby of FIG. 5A.

Referring to the drawing, the data structure 400 transmitted between the audio receiving devices WSay and WSby may include a profile layer 430, a host layer 420 which is a layer underlying the profile layer 430, and a controller layer 410 which is a layer underlying the host layer 420.

Response data transmitted between the audio receiving devices WSay and WSby may be transmitted by using packet data of the profile layer 410 among them.

FIG. 5C illustrates the packet data 490 of the profile layer 430 of FIG. 5B.

Meanwhile, when transmitting data from the second audio receiving device WSby of FIG. 5A to the first audio receiving device WSay, in case in which the packet data 490 of the profile layer 430 in the data structure for Bluetooth communication illustrated in FIG. 5B is used, the packet data of the profile layer 430 needs to be transmitted after the transmission of the packet data of the controller layer 410 and the packet data of the host layer 420, which causes a considerable amount of data delay.

To overcome this problem, in the present disclosure, a new data format for data transmitted between a plurality of audio receiving devices is configured. This will be described with reference to FIG. 6 and the subsequent drawings.

FIG. 6 is a view illustrating a wireless sound output system according to an embodiment of the present disclosure.

Referring to the drawing, a wireless sound output system 10 according to an embodiment of the present disclosure may include a mobile terminal 100 which is an audio source device and a wireless sound output device WS which is an audio synch device.

The wireless sound output device WS may include two audio receiving devices WSa1 and WSb1.

The wireless sound output device WS according to an embodiment of the present disclosure includes a first audio receiving device WSa1 which receives data from the mobile terminal 100 which is an audio transmitting device WTD and a second audio receiving device WSb1 which receives data from the mobile terminal 100, which is the audio transmitting device WTD, or from the first audio receiving device WSa1, and the second audio receiving device WSb1 may transmit response data to the first audio receiving device WSa1 based on the received data.

Meanwhile, after a wireless connection between the mobile terminal 100, which is the audio transmitting device WTD, and the first audio receiving device WSa1, the second audio receiving device WSb1 may transmit response data to the first audio receiving device WSa1.

Meanwhile, the first audio receiving device WSa1 may form a multicast link with the mobile terminal 100, receive at least one media packet from the mobile terminal 100 via the multicast link, and perform bidirectional communication with the mobile terminal 100, and the second audio receiving device WSb1 may join in the multicast link, receive a media packet from the mobile terminal 100 via the multicast link, perform unidirectional communication with the mobile terminal 100, and perform at least one of unidirectional communication and bidirectional communication with the first audio receiving device WSa1.

Meanwhile, the second audio receiving device WSb1 may transmit response data to the first audio receiving device WSa1 after the transmission of the media packet from the mobile terminal 100.

FIGS. 7A to 7C are views referred to for describing FIG. 6.

First, FIG. 7A is a view illustrating a data structure transmitted between the audio receiving devices WSa1 and WSb1 of FIG. 4A.

Referring to the drawing, the data structure 400 transmitted between the audio receiving devices WSa1 and WSb1 may include a profile layer 430, a host layer 420 which is a layer underlying the profile layer 430, and a controller layer 410 which is a layer underlying the host layer 420.

Preferably, response data transmitted between the audio receiving devices WSax and WSbx may be transmitted by using the packet data of the host layer 420 among them.

In this way, transmitting response data between the audio receiving devices WSa1 and WSb1 using the packet data of the host layer 420 can strengthen security compared to using the controller layer 410 of FIG. 4B and significantly reduce data delay compared to using the profile layer 420 of FIG. 5B.

FIG. 7B illustrates the packet data 700 of the controller layer 410 of FIG. 7A.

Referring to the drawing, the packet data 480 of the controller layer 410 may include an access code 710, a header 720, and a payload 730.

According to an embodiment of the present disclosure, the packet data 700 of the controller layer 410 is a new format, and, unlike FIGS. 4C and 5C, the access code 710 includes a device ID 714, and the header 720 includes TYPE information 722 representing a data type.

Accordingly, data transmission delay between the audio receiving devices WSa1 and WSb1 can be reduced, and security can be strengthened. In particular, when transmitting response data from the second audio receiving device WSb1 to the first audio receiving device WSa1, data transmission delay can be reduced, and security can be strengthened.

Meanwhile, unnecessary parameters may be eliminated by setting a new data packet format for the controller layer 410, and packet loss and data transmission loss can be reduced by adding new parameters, i.e., the device ID 714 and the type information 722. Accordingly, data transmission delay between the audio receiving devices can be reduced, and security can be strengthened.

Meanwhile, the payload 730 includes packet data 734 of the host layer 420, and the packet data 734 of the host layer 420 may include acknowledgement (ACK) or non-acknowledgement (NACK) data 734c. Accordingly, data transmission delay between the audio receiving devices can be reduced, and security can be strengthened.

Meanwhile, the response data may include packet data 700 of the profile layer 430, the packet data 734 of the host layer 420 which is a layer underlying the profile layer 430, and the packet data 700 of the controller layer 410 which is a layer underlying the host layer 420. Accordingly, data transmission delay between the audio receiving devices can be reduced, and security can be strengthened.

Meanwhile, the access code 710 may include a preamble 712 for DC compensation, and the header 720 may further include acknowledge indication information (ACK) 724 and sequence information (SN) 726. Accordingly, data transmission delay between the audio receiving devices can be reduced, and security can be strengthened.

Meanwhile, the payload 730 may include length information (LENGTH) 732, type information (TYPE) 734a, sequence information (SN) 734b, and acknowledgment (ACK) or non-acknowledgement (NACK) data 734c. Accordingly, data transmission delay between the audio receiving devices can be reduced, and security can be strengthened.

FIG. 7C illustrates a data format for the controller layer 410 according to the conventional art.

Referring to the drawing, the data format 600 for the controller layer 410 according to the conventional art may include an access code 610, a header 620, and a payload 630.

The access code 610 may include a preamble for DC compensation, a sync word 613 for timing, and a trailer 615 for extended DC compensation.

The header 620 may include LT_ADDR 621 representing a logical transmission address, TYPE 622 representing a type code, FLOW 623 for flow control, ARQN 624 representing acknowledge indication information, SEQN 626 representing sequence information, and HEC 627 for header error check.

The payload 630 may include LLID 631a for logical link identification, FLOW 631b for flow control, LENGTH 632 representing the length of the payload, and DATA 634.

Based on a comparison between the data format 700 of the controller layer 410 according to the embodiment of the present disclosure shown in FIG. 7B and the data format 600 of the controller layer 410 according to the conventional art shown in FIG. 7C, the data format 700 of FIG. 7B is much more simplistic, and unnecessary parameters, for example, the sync word 613, the trailer 615, the LT_ADDR 621, the FLOW 623 for flow control, the HEC 627, the LLID 631a, and the FLOW 631b can be eliminated. Accordingly, data transmission delay between the audio receiving devices can be reduced, and security can be strengthened.

Meanwhile, in the case of a failure to receive data from the mobile terminal 100 which is the audio transmitting device WTD, the first audio receiving device WSa1 transmits retransmission request data to the mobile terminal 100 which is the audio transmitting device WTD, and the retransmission request data may include non-acknowledgement (NACK) data of the host layer 420. Accordingly, data can be received again from the mobile terminal 100 which is the audio transmitting device WTD.

Meanwhile, in case in which the second audio receiving device WSb1 fails to receive data from the mobile terminal 100 which is the audio transmitting device WTD, the second audio receiving device WSb1 may transmit the non-acknowledgement (NACK) data of the host layer 420 to the first audio receiving device WSA1, and the first audio receiving device WSa1 may transmit retransmission request data including the non-acknowledgement (NACK) data of the host layer 420 to the mobile terminal 100 which is the audio transmitting device WTD. Accordingly, data can be received again from the mobile terminal 100 which is the audio transmitting device WTD.

Meanwhile, the wireless sound output device WS according to another embodiment of the present disclosure includes a first audio receiving device WSa1 which receives data of a first format from the mobile terminal 100 which is the audio transmitting device WTD and a second audio receiving device WSb1 which receives data of the first format from the mobile terminal 100 which is the audio transmitting device WTD or from the first audio receiving device WSa1. The second audio receiving device WSb1 may transmit response data of the first format to the first audio receiving device WSa1 based on the received data.

In this case, the packet data 700 of the controller layer 410 of the response data may include an access code 710 and a header 720, and the access code 710 may include a device ID 714, and the header 720 may include type information 722. This will be described with reference to FIGS. 8 and 9.

FIG. 8 is a view illustrating an operation method of a wireless sound output system according to an embodiment of the present disclosure.

Referring to the drawing, the audio transmitting device WTD may transmit data of a first format (S710). Accordingly, the first audio receiving device WSa may receive data of the first format from the audio transmitting device WTD (S711).

Meanwhile, the data of the first format may be data of the host layer 420 of FIG. 7A.

Meanwhile, the first audio receiving device WSa may transmit the received data of the first format (S714).

Accordingly, the second audio receiving device WSb receives data from the audio transmitting device WTD or from the first audio receiving device WSa (S715).

Next, the second audio receiving device WSb may transmit response data of the first format to the first audio receiving device WSa based on the received data (S720).

Accordingly, the first audio receiving device WSa may receive the response data of the first format from the second audio receiving device WSb (S721).

Next, the first audio receiving device WSa may transmit response data of the first format (S726).

Accordingly, the audio transmitting device WTD may receive the response data of the first format.

Meanwhile, in case in which the response data of the first format transmitted by the second audio receiving device WSb is acknowledgement (ACK) data, the audio transmitting device WTD does not transmit data to the second audio receiving device WSb.

Meanwhile, in case in which the response data of the first format transmitted by the second audio receiving device WSb is non-acknowledgement (NACK) data, the audio transmitting device WTD may retransmit data.

Meanwhile, in case in which the response data of the first format transmitted by the first audio receiving device WSa is non-acknowledgement (NACK) data due to a failure to receive data from the first audio receiving device WSa, the audio transmitting device WTD may retransmit data.

FIG. 9 is a view referred to for describing FIG. 8.

Referring to the drawing, the 910th step S910*m* through the 925th step S925*m* exemplify the first audio receiving device WSa's and second audio receiving device WSb's success in data reception.

The audio transmitting device WTD may transmit data of an L2CAP format of the host layer 420 of FIG. 7A, the first audio receiving device WSa may receive the data of the L2CAP format from the audio transmitting device WTD (S910*m*), and the second audio receiving device WSb may receive the data of the L2CAP format from the audio transmitting device WTD (S914*m*).

The second audio receiving device WSb may transmit response data of the L2CAP format, especially, acknowledgement (ACK) data, to the first audio receiving device WSa based on the received data (S920*m*).

Also, the first audio receiving device WSa may transmit the acknowledgement (ACK) data of the L2CAP format to the audio transmitting device WTD (S925*m*).

Next, the 940th step S940*m* through the 979th step S979*m* exemplify a retransmission caused by the first audio receiving device WSa's failure to receive data.

The audio transmitting device WTD transmits data of the L2CAP format of the host layer 420 of FIG. 7A, the first audio receiving device WSa fails to receive the data of the L2CAP format from the audio transmitting device WTD (S940*m*), and the second audio receiving device WSb receives the data of the L2CAP format from the audio transmitting device WTD (S945*m*).

The second audio receiving device WSb may transmit response data of the L2CAP format, especially, acknowledgement (ACK) data, to the first audio receiving device WSa based on the received data (S950*m*).

Meanwhile, the first audio receiving device WSa may transmit retransmission request data or non-acknowledgement (NACK) data of the L2CAP format to the audio transmitting device WTD (S955*m*).

The audio transmitting device WTD retransmits the data of the L2CAP format based on the retransmission request data or the non-acknowledgment (NACK) data (S970*m*). In response to this, the first audio receiving device WSa may receive the data of the L2CAP format from the audio transmitting device WTD (S970*m*).

While the second audio receiving device WSb may receive the data of the L2CAP format (S975*m*), the data will be discarded since it has already been received.

Meanwhile, since the retransmission data of the L2CAP format has been successfully received, the first audio receiving device WSa may transmit response data of the L2CAP format, especially, acknowledgement (ACK) data to the audio transmitting device WTD (S979*m*).

Next, the 980th step S980*m* through the 998th step S998*m* exemplify a retransmission caused by the second audio receiving device WSb's failure to receive data.

The audio transmitting device WTD transmits data of the L2CAP format of the host layer 420 of FIG. 7A, the first audio receiving device WSa receives the data of the L2CAP format from the audio transmitting device WTD (S980*m*), and the second audio receiving device WSb has failed to receive the data of the L2CAP format from the audio transmitting device WTD and therefore it is not possible for the second audio receiving device WSb to confirm the reception of the data.

Accordingly, upon determining that the second audio receiving device WSb has failed to receive the data, the first audio receiving device WSa may transmit retransmission request data or non-acknowledgement (NACK) data of the L2CAP format to the audio transmitting device WTD (S985*m*).

The audio transmitting device WTD retransmits the data of the L2CAP format based on the retransmission request data or the non-acknowledgment (NACK) data (S990*m*). In response to this, the second audio receiving device WSb may receive the data of the L2CAP format from the audio transmitting device WTD (S995*m*).

While the first audio receiving device WSa may receive the data of the L2CAP format (S993*m*), the data will be discarded since it has already been received.

Since the retransmission data of the L2CAP format has been successfully received, the second audio receiving device WSb may transmit response data of the L2CAP format, especially, acknowledgement (ACK) data, to the first audio receiving device WSa (S996*m*).

Meanwhile, since the retransmission data of the L2CAP format has been successfully received, the second audio receiving device WSb may transmit response data of the L2CAP format, especially, acknowledgement (ACK) data, to the audio transmitting device WTD (S998*m*).

Meanwhile, the wireless sound output device WS according to yet another embodiment of the present disclosure includes a first audio receiving device WSa1 which receives data of a first format from the mobile terminal 100 which is the audio transmitting device WTD and a second audio receiving device WSb1 which receives data of the first format from the mobile terminal 100 which is the audio transmitting device WTD or from the first audio receiving device WSa1. The second audio receiving device WSb1 may transmit response data of the first format to the first audio receiving device WSa1 based on the received data.

In this case, the packet data 700 of the controller layer 410 of the response data may include an access code 710 and a header 720, and the access code 710 may include a device ID 714, and the header 720 may include type information 722. This will be described with reference to FIGS. 10 and 11.

FIG. 10 is a view illustrating an operation method of a wireless sound output system according to another embodiment of the present disclosure.

Referring to the drawing, the audio transmitting device WTD may transmit data of a first format (S810). Accordingly, the first audio receiving device WSa may receive data of the first format from the audio transmitting device WTD (S811).

Meanwhile, the data of the first format may be data of the host layer 420 of FIG. 7A.

Meanwhile, the first audio receiving device WSa may transmit the received data of the first format (S814).

Accordingly, the second audio receiving device WSb receives data from the audio transmitting device WTD or from the first audio receiving device WSa (S815).

Next, the second audio receiving device WSb may transmit response data of a second format to the first audio receiving device WSa based on the received data (S820).

Meanwhile, the data of the second format may be the data of the controller layer 410 of FIG. 7B.

Accordingly, the first audio receiving device WSa may receive the response data of the second format from the second audio receiving device WSb (S821).

Next, the first audio receiving device WSa may transmit response data of the second format (S826).

Accordingly, the audio transmitting device WTD may receive the response data of the second format.

Meanwhile, in case in which the response data of the second format transmitted by the second audio receiving device WSb is acknowledgement (ACK) data, the audio transmitting device WTD does not transmit data.

Meanwhile, in case in which the response data of the second format transmitted by the second audio receiving device WSb is non-acknowledgement (NACK) data, the audio transmitting device WTD may retransmit data.

Meanwhile, in case in which the first audio receiving device WSa has failed to receive data and therefore the response data of the second format transmitted by the first audio receiving device WSa is non-acknowledgement (NACK) data, the audio transmitting device WTD may retransmit data.

FIG. 11 is a view referred to for describing FIG. 10.

Referring to the drawing, the 910th step S910a through the 925th step S925a exemplify the first audio receiving device WSa's and second audio receiving device WSb's success in data reception.

The audio transmitting device WTD may transmit data of an L2CAP format of the host layer 420 of FIG. 7A, the first audio receiving device WSa may receive the data of the L2CAP format from the audio transmitting device WTD (S910a), and the second audio receiving device WSb may receive the data of the L2CAP format from the audio transmitting device WTD (S914a).

The second audio receiving device WSb may transmit response data of the data format of FIG. 7B, especially, acknowledgement (ACK) data, to the first audio receiving device WSa based on the received data (S920a).

Also, the first audio receiving device WSa may transmit the acknowledgement (ACK) data of the L2CAP format to the audio transmitting device WTD (S925a).

Next, the 940th step S940a through the 979th step S979a exemplify a retransmission caused by the first audio receiving device WSa's failure to receive data.

The audio transmitting device WTD transmits data of the L2CAP format of the host layer 420 of FIG. 7A, the first audio receiving device WSa fails to receive the data of the L2CAP format from the audio transmitting device WTD (S940a), and the second audio receiving device WSb receives the data of the L2CAP format from the audio transmitting device WTD (S945a).

The second audio receiving device WSb may transmit response data of the data format 700 of FIG. 7B, especially, acknowledgement (ACK) data, to the first audio receiving device WSa based on the received data (S950a).

Meanwhile, the first audio receiving device WSa may transmit retransmission request data or non-acknowledgement (NACK) data of the L2CAP format to the audio transmitting device WTD (S955a).

The audio transmitting device WTD retransmits the data of the L2CAP format based on the retransmission request data or the non-acknowledgment (NACK) data (S970a). In response to this, the first audio receiving device WSa may receive the data of the L2CAP format from the audio transmitting device WTD (S970a).

While the second audio receiving device WSb may receive the data of the L2CAP format (S975a), the data will be discarded since it has already been received.

Since the retransmission data of the L2CAP format has been successfully received, the first audio receiving device WSa may transmit response data of the L2CAP format, especially, acknowledgement (ACK) data, to the audio transmitting device WTD (S979a).

Next, the 980th step S980a through the 998th step S998a exemplify a retransmission caused by the second audio receiving device WSb's failure to receive data.

The audio transmitting device WTD transmits data of the L2CAP format of the host layer 420 of FIG. 7A, the first audio receiving device WSa receives the data of the L2CAP format from the audio transmitting device WTD (S980a), and the second audio receiving device WSb has failed to receive the data of the L2CAP format from the audio transmitting device WTD or from the first audio receiving device WSa and therefore it is not possible for the second audio receiving device WSb to confirm the reception of the data.

Accordingly, upon determining that the second audio receiving device WSb has failed to receive the data, the first audio receiving device WSa may transmit retransmission request data or non-acknowledgement (NACK) data of the L2CAP format to the audio transmitting device WTD (S985a).

The audio transmitting device WTD retransmits the data of the L2CAP format based on the retransmission request data or the non-acknowledgment (NACK) data (S990a). In response to this, the second audio receiving device WSb may receive the data of the L2CAP format from the audio transmitting device WTD (S995a).

While the first audio receiving device WSa may receive the data of the L2CAP format (S993a), the data will be discarded since it has already been received.

Since the second audio receiving device WSb has successfully received retransmission data of the L2CAP format, the second audio receiving device WSb may transmit response data of the data format 700 of FIG. 7B, especially, acknowledgement (ACK) data, to the first audio receiving device WSa (S996a).

Meanwhile, since the retransmission data of the L2CAP format has been successfully received, the second audio receiving device WSb may transmit response data of the data format 700 of FIG. 7B, especially, acknowledgement (ACK) data, to the audio transmitting device WTD (S998a).

FIG. 12 is a view illustrating a wireless sound output system according to another embodiment of the present disclosure.

Referring to the drawing, the wireless sound output system 10b according to another embodiment of the present disclosure may include an image display apparatus 200 which is an audio source device and a wireless sound output device WS which is an audio synch device.

The wireless sound output device WS may include a plurality of audio receiving devices.

In the drawing, the wireless sound output device WS is illustrated as four audio receiving devices WSa2, WSb2, WSc2, and WSd2 but not limited thereto, and may include more audio receiving devices.

The four audio receiving devices WSa2, WSb2, WSc2, and WSd2 may be wireless speakers.

Meanwhile, the first audio receiving device WSa2 among the four audio receiving devices may operate as a master audio receiving device, and the other three audio receiving devices WSb2, WSc2, and WSd2 may operate as slave audio receiving devices.

Meanwhile, the master audio receiving device WSa2 may exchange data with the image display apparatus 200 which is an audio source device, and also may exchange data with the slave audio receiving devices WSb2, WSc2, and WSd2.

Meanwhile, the slave audio receiving devices WSb2, WSc2, and WSd2 may exchange data not with the audio transmitting device WTD but with the master audio receiving device WSa2. In particular, when transmitting acknowledged (ACK) or non-acknowledged (NACK) data, they may exchange data not with the image display apparatus 200 but with the master audio receiving device WSa2.

Meanwhile, the wireless sound output device WS according to an embodiment of the present disclosure includes a first audio receiving device WSa2 which receives data from the image display apparatus 200 which is an audio transmitting device WTD and a second audio receiving device WSb2 which receives data from the image display apparatus 200, which is the audio transmitting device WTD, or from the first audio receiving device WSa2, and the second audio receiving device WSb2 may transmit response data to the first audio receiving device WSa2 based on the received data.

Meanwhile, after a wireless connection between the image display apparatus 200, which is the audio transmitting device WTD, and the first audio receiving device WSa2, the second audio receiving device WSb2 may transmit response data to the first audio receiving device WSa2.

Meanwhile, the first audio receiving device WSa2 may form a multicast link with the image display apparatus 200, receive at least one media packet from the image display apparatus 200 via the multicast link, and perform bidirectional communication with the image display apparatus 200, and the second audio receiving device WSb2 may join in the multicast link, receive a media packet from the image display apparatus 200 via the multicast link, perform unidirectional communication with the image display apparatus 200, and perform at least one of unidirectional communication and bidirectional communication with the first audio receiving device WSa2.

Meanwhile, the second audio receiving device WSb2 may transmit response data to the first audio receiving device WSa1 after the transmission of the media packet from the image display apparatus 200.

The operation of the wireless sound output device WS shown in FIG. 12 may apply in the same way as described with reference to FIGS. 6 to 10.

The image display apparatus 200 may include a display 280.

The image display apparatus 200 may receive an image signal from various external devices or the like, signal-process it, and display the same on the display 280.

Examples of the various external devices may include a computer PC, a mobile terminal 600 such as a smartphone, a set-top box STB, a game console GSB, a server SVR, etc.

Meanwhile, the display 280 may be implemented as one of various panels. For example, the display 280 may be one of an organic light-emitting panel (OLED panel), an inorganic light-emitting panel (LED panel), and a self-emissive panel such as a micro LED panel.

Meanwhile, the image display apparatus 200 shown in FIG. 12 may be a TV, a monitor, a tablet PC, a mobile terminal, a display device for a vehicle, and the like.

FIG. 13 is an internal block diagram of the image display apparatus of FIG. 12.

Referring to FIG. 13, the image display apparatus 200 according to an embodiment of the present disclosure may include an image receiver 205, an external device interface 230, a memory 240, a user input interface 250, a sensor device (not shown), a signal processing device 270, a display 280, and an audio output device 285.

The image receiver 205 may include a tuner 210, a demodulator 220, a network interface 235, and an external device interface 230.

Meanwhile, unlike the drawing, the image receiver 205 may include only the tuner 210, the demodulator 220, and the external device interface 230. That is, the image receiver 205 may not include the network interface 235.

The tuner 210 selects a radio frequency (RF) broadcast signal corresponding to a channel selected by a user or all prestored channels from among RF broadcast signals received through an antenna (not shown). In addition, the tuner 210 converts the selected RF broadcast signal into an intermediate frequency (IF) signal, a baseband image, or an audio signal.

To receive broadcast signals of a plurality of channels, a plurality of tuners 210 may be provided. Alternatively, a single tuner to receive broadcast signals of a plurality of channels simultaneously may be provided.

The demodulator 220 receives and demodulates the DIF signal converted by the tuner 210.

After performing demodulation and channel decoding, the demodulator 220 may output a transport stream (TS) signal. Herein, the stream signal may be a signal obtained by multiplexing an image signal, an audio signal, and a data signal.

The TS signal output from the demodulator 220 may be input to the signal processing device 270. After performing demultiplexing and image/audio signal processing, the signal processing device 270 outputs an image to the display 280 and audio to the audio output device 285.

The external device interface 230 may transmit or receive data to or from an external device connected thereto (not shown). To this end, the external device interface 230 may include an audio/video (A/V) input/output device (not shown).

The external device interface 230 may be connected to external devices such as a digital versatile disc (DVD), a Blu-ray player, a game console, a camera, a camcorder, a (notebook) computer, and a set-top box in a wired/wireless manner and perform input/output operations with external devices.

The A/V input/output device may receive image and audio signals from an external device. The wireless transceiver (not shown) may perform short-range wireless communication with other electronic devices.

By using the wireless transceiver (not shown), the external device interface 230 may exchange data with a neighboring mobile terminal. Specifically, the external device interface 230 may receive device information, information of an executed application, an application image, and the like, in a mirroring mode.

The network interface 235 provides an interface for connecting the image display apparatus 200 with a wired/wireless network including the Internet. For example, the network interface 235 may receive content or data provided by an Internet or content provider or a network operator over a network.

Meanwhile, the network interface 235 may include a wireless transceiver (not shown).

The memory 240 may store programs for processing and control of signals in the signal processing device 270 and also store a signal-processed image, audio, or data signal.

The memory 240 may function to temporarily store an image signal, an audio signal, or a data signal input through the external device interface 230. In addition, the memory 240 may store information about a predetermined broadcast channel through the channel memorization function such as a channel map.

While an embodiment in which the memory 240 is provided separately from the signal processing device 270 is illustrated in FIG. 13, embodiments of the present disclosure are not limited thereto. The memory 240 may be included in the signal processing device 270.

The user input interface 250 may transmit a signal input by a user to the signal processing device 270 or transmit a signal from the signal processing device 270 to the user.

For example, the user input interface 250 may transmit/receive user input signals such as power on/off, channel selection, and screen window setting to/from the remote control device 300 or transmit user input signals input through local keys (not shown) such as a power key, a channel key, a volume key, or a setting key to the signal processing device 270. The user input interface 250 may transmit user input signals input through a sensor device (not shown) to sense gesture of the user to the signal processing device 270 or transmit a signal from the signal processing device 270 to the sensor device (not shown).

The signal processing device 270 may demultiplex the TS signal input through the tuner 210, the demodulator 220, the network interface 235, or the external device interface 230 or process the demultiplexed signal to generate a signal for outputting an image or audio.

For example, the signal processing device 270 may receive a broadcasting signal or an HDMI signal received from the image receiver 205 and perform a signal processing based on the received broadcasting signal or HDMI signal to output the signal processed image signal.

The image signal processed by the signal processing device 270 may be input to the display 280 such that an image corresponding to the image signal may be displayed on the display. In addition, the image signal processed by the signal processing device 270 may be input to an external output device through the external device interface 230.

The audio signal processed by the signal processing device 270 may be output to the audio output device 285 in the form of sound. In addition, the audio signal processed by the signal processing device 270 may be input to an external output device through the external device interface 230.

Although not shown in FIG. 13, the signal processing device 270 may include a demultiplexer and an image processor. That is, the signal processing device 270 may perform various types of signal processing, and accordingly, may be implemented in a system on chip (SOC) format, which will be described with reference to FIG. 14 later.

Additionally, the signal processing device 270 may control an overall operation of the image display apparatus 200. For example, the signal processing device 270 may control the tuner 210 to tune to an RF broadcast corresponding to a channel selected by the user or a prestored channel.

The signal processing device 270 may control the image display apparatus 200 according to a user command input through the user input interface 250 or according to an internal program.

The signal processing device 270 may control the display 280 to display an image. Herein, the image displayed on the display 280 may be a still image, a moving image, a 2D image, or a 3D image.

The signal processing device 270 may control such that a predetermined object is displayed in an image displayed on the display 280. For example, the object may be at least one of an accessed web page (a newspaper, a magazine, etc.), an electronic program guide (EPG), various menus, a widget, an icon, a still image, a moving image, or text.

The signal processing device 270 may recognize the location of the user based on an image captured by a capture device (not shown). For example, the signal processing device 270 may recognize the distance between the user and the image display apparatus 200 (i.e., a z-axis coordinate). Additionally, the signal processing device 270 may recognize an x-axis coordinate and y-axis coordinate in the display 280, corresponding to the location of the user.

The display 280 generates drive signals by converting an image signal, a data signal, an on-screen display (OSD) signal, and a control signal processed by the signal processing device 270 or an image signal, a data signal, and a control signal received from the external device interface 230.

The display 280 may include a touchscreen and may function as an input device as well as an output device.

The audio output device 285 receives an audio signal processed by the signal processing device 270 and outputs audio.

A capture device (not shown) captures an image of the user. The capture device (not shown) may be implemented using one camera. However, embodiments of the present disclosure are not limited thereto and the capture device (not shown) may be implemented using a plurality of cameras. Information about the image captured by the capture device (not shown) may be input to the signal processing device 270.

The signal processing device 270 may sense user gestures based on the image captured by the capture device (not shown), the signal sensed by the sensor device (not shown), or a combination thereof.

The power supply 190 supplies power to overall parts of the image display apparatus 200. In particular, the power supply 190 may supply power to the signal processing device 270, which may be implemented in the form of system-on-chip (SOC), the display 280 for displaying images, and the audio output device 285 for outputting audio signals.

Specifically, the power supply 190 may include a converter for converting alternating current (AC) power into direct current (DC) power and a DC-DC converter for changing the level of the DC power.

The remote control device 300 transmits a user input signal to the user input interface 250. To this end, the remote control device 300 may use Bluetooth, RF communication, infrared (IR) communication, ultra-wideband (UWB), or ZigBee. In addition, the remote control device 300 may receive an image signal, an audio signal, or a data signal from the user input interface 250 and then display or audibly output the received signal.

The image display apparatus 200 may be a fixed or mobile digital image receiver capable of receiving a digital broadcast.

FIG. 13 is a block diagram of the image display apparatus 200 according to an embodiment of the present disclosure. Some of the constituents of the image display apparatus shown in the diagram may be combined or omitted or other constituents may be added thereto, according to specifications of the image display apparatus 200 as actually implemented. That is, two or more constituents of the image display apparatus 200 may be combined into one constituent or one constituent thereof may be subdivided into two or more constituents, as needed. In addition, a function performed in each block is simply illustrative and specific operations or units of the block do not limit the scope of the present disclosure.

FIG. 14 is an internal block diagram of the signal processing device shown in FIG. 13.

Referring to FIG. 14, the signal processing device 270 according to an embodiment of the present disclosure may include a demultiplexer 310, an image processor 320, a processor 330, and an audio processor 370. The signal processing device 270 may further include a data processor (not shown).

The demultiplexer 310 demultiplexes an input TS signal. For example, when an MPEG-2 TS signal is input, the demultiplexer 310 may demultiplex the MPEG-2 TS signal into an image signal, an audio signal, and a data signal. Herein, the TS signal input to the demultiplexer 310 may be a TS signal output from the tuner 210, the demodulator 220, or the external device interface 230.

The image processor 320 may perform signal processing on the input image signal. For example, the image processor 320 may perform image processing on the demultiplexed image signal from the demultiplexer 310.

To this end, the image processor 320 may include an image decoder 325, a scaler 335, an image quality processor 635, an image encoder (not shown), an OSD processor 340, a frame rate converter 350, and a formatter 360.

The image decoder 325 decodes the demultiplexed image signal, and the scaler 335 scales the resolution of the decoded image signal for outputting the image signal through the display 280.

The video decoder 325 may be provided with decoders that operate in conformance to various standards. For example, the video decoder 325 may include, for example, an MPEG-2 decoder, an H.264 decoder, a 3D video decoder for a color image a depth image, a decoder for multi-view images, and so on.

The scaler 335 may scale a received image signal which is decoded by the image decoder 325.

For example, when the size or resolution of a received image signal is small and low, the scaler 335 may upscale the received image signal. When the size or resolution of a received image signal is great and high, the scaler 335 may downscale the received image signal.

The image quality processor 635 may perform image quality processing based on a received image signal which is decoded by the image decoder 325.

For example, the image quality processor 635 may reduce noise of a received image signal, extend grayscale of the received image signal, enhance image resolution, perform High Dynamic Range (HDR)-based signal processing, change a frame rate, or perform image quality processing to corresponding to characteristics of a panel, especially, an organic light emitting panel.

The OSD processor 340 generates an OSD signal autonomously or according to a user input signal. For example, the OSD processor 340 may generate a signal for displaying a variety of information in the form of graphics or texts on the screen of the display 280 based on a user input signal. The generated OSD signal may include a variety of data such as a user interface screen, various menu screens, a widget, and an icon of the image display apparatus 200. The generated OSD signal may also include a 2D object or a 3D object.

The OSD processor 340 may generate a pointer which can be displayed on the display, based on a pointing signal input from the remote control device 300. In particular, the pointer may be generated by a pointing signal processor (not shown) and the OSD processor 340 may include the pointing signal generator (not shown). Obviously, it is possible to provide the pointing signal processor (not shown) separately from the OSD processor 340.

The frame rate converter (FRC) 350 may convert the frame rate of an input image. The FRC 350 may also directly output the input image without frame rate conversion.

The formatter 360 may change the format of a received image signal to an image signal to be displayed on the display.

Particularly, the formatter 360 may change the format of a received image signal to correspond to characteristics of a display panel.

The processor 330 may control overall operations in the image display apparatus 200 or the signal processor 270.

For example, the processor 330 may control the tuner 210 to tune to an RF broadcast signal corresponding to a user-selected channel or a pre-stored channel.

The processor 330 may control the image display apparatus 200 according to a user command received through the user input interface 250 or according to an internal program.

In addition, the processor 330 may control data transmission through the network interface 235 or the external device interface 230.

In addition, the processor 330 may control operations of the demultiplexer 310 and the image processor 320 in the signal processor 270.

An audio processor 370 in the signal processing device 270 may process the demultiplexed audio signal. To this end, the audio processor 370 may include various decoders.

The audio processor 370 in the signal processing device 270 may perform processing such as adjustment of bass, treble, and volume.

The data processor (not shown) in the signal processing device 270 may perform data processing on the demultiplexed data signal. For example, in case in which the demultiplexed data signal is a coded data signal, the data processor (not shown) may decode the data signal. The coded data signal may be EPG information containing broadcast information such as a start time and end time of a broadcast program broadcast on each channel.

The block diagram of the signal processing device 270 shown in FIG. 14 is simply illustrative. Constituents of the block diagram may be integrated, added or omitted according to the specifications of the signal processing device 270 as actually implemented.

In particular, the frame rate converter 350 and the formatter 360 may be provided separately from the image processor 320.

While the present disclosure has been particularly shown and described with reference to exemplary embodiments thereof, it will be understood by those of ordinary skill in the art that various changes in form and detail may be made herein without departing from the spirit and scope of the present disclosure as defined by the following claims and such modifications and variations should not be understood individually from the technical idea or aspect of the present disclosure.

What is claimed is:

1. A wireless sound output device comprising:
a first audio receiving device configured to receive data from an audio transmitting device;
a second audio receiving device configured to receive data from the audio transmitting device or from the first audio receiving device,
wherein the second audio receiving device transmits response data to the first audio receiving device based on the received data,
wherein packet data of a controller layer of the response data includes an access code and a header,
wherein the access code includes a device ID, and the header includes type information,
wherein the response data includes packet data of a profile layer, the packet data of a host layer which is a layer underlying the profile layer, and the packet data of the controller layer which is a layer underlying the host layer.

2. The wireless sound output device of claim 1, wherein the first audio receiving device forms a multicast link with the audio transmitting device, receives at least one media packet from the audio transmitting device via the multicast link, and performs bidirectional communication with the audio transmitting device, and
wherein the second audio receiving device joins in the multicast link, receives a media packet from the audio transmitting device via the multicast link, performs unidirectional communication with the audio transmitting device, and performs at least one of unidirectional communication and bidirectional communication with the first audio receiving device.

3. The wireless sound output device of claim 2, wherein the second audio receiving device transmits the response data to the first audio receiving device after the transmission of the media packet from the audio transmitting device.

4. The wireless sound output device of claim 1, wherein the packet data of the controller layer of the response data further includes a payload,
wherein the payload includes packet data of a host layer,
wherein the packet data of the host layer includes acknowledgement (ACK) or non-acknowledgement (NACK) data.

5. The wireless sound output device of claim 1, wherein the second audio receiving device transmits acknowledgement (ACK) or non-acknowledgement (NACK) data of the host layer as the response data to the first audio receiving device.

6. The wireless sound output device of claim 1, wherein, in a case of a failure to receive data from the audio transmitting device, the first audio receiving device transmits retransmission request data to the audio transmitting device,
wherein the retransmission request data includes non-acknowledgement (NACK) data of the host layer.

7. The wireless sound output device of claim 1, wherein, in case in which the second audio receiving device fails to receive data from the audio transmitting device or from the first audio receiving device, the first audio receiving device transmits retransmission request data to the audio transmitting device,
wherein the retransmission request data includes the non-acknowledgement (NACK) data of the host layer.

8. The wireless sound output device of claim 1, wherein, in case in which the second audio receiving device fails to receive data from the audio transmitting device or from the first audio receiving device, the second audio receiving device transmits non-acknowledgement (NACK) data of the host layer to the first audio receiving device, and
wherein the first audio receiving device transmits retransmission request data including the non-acknowledgement (NACK) data of the host layer to the audio transmitting device.

9. The wireless sound output device of claim 1, wherein the access code further includes a preamble, and the header further includes acknowledge indication information and sequence information.

10. The wireless sound output device of claim 1, wherein the packet data of the controller layer of the response data further includes a payload,
wherein the payload includes length information, type information, sequence information, and acknowledgement (ACK) or non-acknowledgement (NACK) data.

11. A wireless sound output device comprising:
a first audio receiving device configured to receive data of a first format from the audio transmitting device; and
a second audio receiving device configured to receive data of the first format from the audio transmitting device or from the first audio receiving device,
wherein the second audio receiving device transmits response data of the first format to the first audio receiving device based on the received data,
wherein packet data of a controller layer of the response data includes an access code and a header,
wherein the access code includes a device ID, and the header includes type information,
wherein the packet data of the controller layer of the response data further includes a payload,
wherein the payload includes packet data of a host layer,
wherein the packet data of the host layer includes acknowledgement (ACK) or non-acknowledgement (NACK) data.

12. The wireless sound output device of claim 11, wherein the second audio receiving device transmits acknowledgement (ACK) or non-acknowledgement (NACK) data of the host layer overlying the controller layer as the response data to the first audio receiving device.

13. A wireless sound output device comprising:
a first audio receiving device configured to receive data of a first format from the audio transmitting device; and
a second audio receiving device configured to receive data of the first format from the audio transmitting device or from the first audio receiving device,
wherein the second audio receiving device transmits response data of a second format which is different than the first format to the first audio receiving device based on the received data,
wherein packet data of a controller layer of the response data includes an access code and a header,
wherein the access code includes a device ID, and the header includes type information,
wherein the second audio receiving device transmits acknowledgement (ACK) or non-acknowledgement (NACK) data of a host layer overlying the controller layer as the response data to the first audio receiving device.

14. The wireless sound output device of claim 13, wherein the packet data of the controller layer of the response data further includes a payload,
wherein the payload includes packet data of a host layer,
wherein the packet data of the host layer includes acknowledgement (ACK) or non-acknowledgement (NACK) data.

15. A wireless sound output system comprising:

an audio transmitting device; and a wireless sound output device, wherein the wireless sound output device comprises:

a first audio receiving device configured to receive data from an audio transmitting device;

a second audio receiving device configured to receive data from the audio transmitting device or from the first audio receiving device, wherein the second audio receiving device transmits response data to the first audio receiving device based on the received data, wherein packet data of a controller layer of the response data includes an access code and a header, wherein the access code includes a device ID, and the header includes type information, wherein the first audio receiving device forms a multicast link with the audio transmitting device, receives at least one media packet from the audio transmitting device via the multicast link, and performs bidirectional communication with the audio transmitting device, and wherein the second audio receiving device joins in the multicast link, receives a media packet from the audio transmitting device via the multicast link, performs unidirectional communication with the audio transmitting device, and performs at least one of unidirectional communication and bidirectional communication with the first audio receiving device.

16. The wireless sound output system of claim 15, wherein, after a wireless connection between the audio transmitting device and the first audio receiving device, the second audio receiving device transmits response data to the first audio receiving device.

* * * * *